United States Patent
Cai et al.

(10) Patent No.: US 12,131,321 B2
(45) Date of Patent: Oct. 29, 2024

(54) DATA PROCESSING METHOD, APPARATUS, DEVICE, AND MEDIUM IN BLOCKCHAIN FUND SETTLEMENT SYSTEM

(71) Applicant: TENCENT TECHNOLOGY (SHENZHEN) COMPANY LIMITED, Guangdong (CN)

(72) Inventors: Yi Ge Cai, Shenzhen (CN); Jian Jun Zhang, Shenzhen (CN); Zi Chao Tang, Shenzhen (CN); Jun Zang, Shenzhen (CN); Qing Qin, Shenzhen (CN); Chen Yang, Shenzhen (CN); Jin Long Chen, Shenzhen (CN); Zi Jue Zhang, Shenzhen (CN); Shuai Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 450 days.

(21) Appl. No.: 17/219,113

(22) Filed: Mar. 31, 2021

(65) Prior Publication Data
US 2021/0217004 A1    Jul. 15, 2021

Related U.S. Application Data

(63) Continuation of application No. PCT/CN2020/071277, filed on Jan. 10, 2020.

(30) Foreign Application Priority Data

Jan. 16, 2019   (CN) .......................... 201910041035.2

(51) Int. Cl.
*G06Q 20/38*   (2012.01)
*G06F 16/245*   (2019.01)
(Continued)

(52) U.S. Cl.
CPC ......... *G06Q 20/389* (2013.01); *G06F 16/245* (2019.01); *G06F 21/64* (2013.01);
(Continued)

(58) Field of Classification Search
CPC ............. G06Q 20/389; G06Q 20/3825; G06Q 20/3829; G06Q 30/018; G06Q 2220/00;
(Continued)

(56) References Cited

U.S. PATENT DOCUMENTS

| | | | |
|---|---|---|---|
| 2013/0332344 A1* | 12/2013 | Weber | G06Q 20/385 705/39 |
| 2016/0330027 A1* | 11/2016 | Ebrahimi | H04L 9/3066 |

(Continued)

FOREIGN PATENT DOCUMENTS

| | | |
|---|---|---|
| CN | 107124278 A | 9/2017 |
| CN | 107358417 A | 11/2017 |

(Continued)

OTHER PUBLICATIONS

Andreas M. Antonopoulos, Mastering Bitcoin, Dec. 2014, O'Reilly Media, Inc., First Edition, 262 (Year: 2014).*

(Continued)

*Primary Examiner* — Patrick McAtee
*Assistant Examiner* — Zesheng Xiao
(74) *Attorney, Agent, or Firm* — Sughrue Mion, PLLC

(57) ABSTRACT

A data processing method, an apparatus, a device, and a medium in a blockchain fund settlement system are provided. A data processing method in a blockchain fund settlement system, performed by at least one processor of a settlement institution terminal, includes: querying, on a blockchain, a settlement request that is to be processed by the settlement institution terminal between a fund settlement initiator and a fund settlement recipient, the settlement request being generated by an initiator terminal of the fund (Continued)

settlement initiator and recorded on the blockchain; receiving the settlement request based on the querying; and generating a settlement result of a settlement performed according to the settlement request, and recording the settlement result on the blockchain.

14 Claims, 20 Drawing Sheets

(51) Int. Cl.
   *G06F 21/64*   (2013.01)
   *G06Q 30/018*  (2023.01)
   *H04L 9/00*    (2022.01)
   *H04L 9/30*    (2006.01)

(52) U.S. Cl.
   CPC ..... *G06Q 20/3825* (2013.01); *G06Q 20/3829* (2013.01); *G06Q 30/018* (2013.01); *H04L 9/30* (2013.01); *G06Q 2220/00* (2013.01); *H04L 9/50* (2022.05)

(58) Field of Classification Search
   CPC ......... G06F 16/245; G06F 21/64; H04L 9/30; H04L 9/50
   See application file for complete search history.

(56) References Cited

U.S. PATENT DOCUMENTS

| | | | |
|---|---|---|---|
| 2017/0344435 A1* | 11/2017 | Davis | G06F 16/9014 |
| 2017/0366516 A1 | 12/2017 | Pattanaik et al. | |
| 2018/0082268 A1* | 3/2018 | Sheerin | G06Q 20/4014 |
| 2019/0205873 A1* | 7/2019 | Kamalsky | G06Q 40/08 |
| 2019/0278805 A1* | 9/2019 | Li | G06F 16/904 |
| 2020/0220770 A1* | 7/2020 | Kawahara | H04L 9/3247 |
| 2020/0229941 A1* | 7/2020 | Kaddoura | A61F 2/447 |

FOREIGN PATENT DOCUMENTS

| | | | | |
|---|---|---|---|---|
| CN | 107491948 A | * | 12/2017 | .......... G06Q 20/085 |
| CN | 108171489 A | | 6/2018 | |
| CN | 108520412 A | | 9/2018 | |
| CN | 108805564 A | | 11/2018 | |
| CN | 110245522 A | | 9/2019 | |

OTHER PUBLICATIONS

Written Opinion for PCT/CN2020/071277 dated Apr. 15, 2020.
International Search Report for PCT/CN2020/071277 dated Apr. 15, 2020.
Written Opinion of the International Searching Authority issued Apr. 15, 2020 in International Application No. PCT/CN2020/071277.

* cited by examiner

DATA PROCESSING METHOD, APPARATUS, DEVICE, AND MEDIUM IN BLOCKCHAIN FUND SETTLEMENT SYSTEM

CROSS-REFERENCE TO RELATED APPLICATION(S)

This application is a bypass continuation application of International Application No. PCT/CN2020/071277, filed on Jan. 10, 2020, which claims priority to Chinese Patent Application No. 201910041035.2, entitled "DATA PROCESSING METHOD, TERMINAL, AND MEDIUM IN BLOCKCHAIN FUND SETTLEMENT SYSTEM" and filed with the China National Intellectual Property Administration on Jan. 16, 2019, the disclosures of which are herein incorporated by reference in their entireties.

FIELD

Example embodiments of the disclosure relate to the field of blockchain, and in particular, to a data processing technology in a blockchain fund settlement system.

BACKGROUND

In a conventional fund settlement system, fund settlement is centrally performed by a settlement institution. In such a centralized fund settlement system, once a settlement institution is maliciously attacked and a large amount of fund settlement records are leaked and tampered with, direct stakeholders of the fund settlement, that is, a fund settlement initiator, a fund settlement recipient, and the settlement institution undertake economic losses caused by the malicious attack. In addition, in this case, the settlement institution that uses credit as a maximum guarantee to be responsible for centralized processing of fund settlement services may lose trust and credibility from parties of the fund settlement, which may shake the entire fund settlement system.

SUMMARY

Example embodiments of the disclosure provide a data processing method, an apparatus, a device, and a medium in a blockchain fund settlement system, to improve the credibility and security of the fund settlement system.

To achieve the foregoing objective, the embodiments of the disclosure provide the following technical solutions.

According to one aspect of an example embodiment of the disclosure, a data processing method in a blockchain fund settlement system, performed by at least one processor of a settlement institution terminal, is provided. The method includes: querying, on a blockchain, a settlement request that is to be processed by the settlement institution terminal between a fund settlement initiator and a fund settlement recipient, the settlement request being generated by an initiator terminal of the fund settlement initiator and recorded on the blockchain; receiving the settlement request based on the querying; and generating a settlement result of a settlement performed according to the settlement request, and recording the settlement result on the blockchain.

According to one aspect of the embodiments of the disclosure, a settlement institution apparatus in a blockchain fund settlement system is provided. The settlement institution apparatus includes: at least one memory configured to store program code; and at least one processor configured to read the program code and operate as instructed by the program code, the program code including: settlement request query code configured to cause at least one of the at least one processor to query, on a blockchain, a settlement request that is to be processed by the settlement institution apparatus between a fund settlement initiator and a fund settlement recipient, the settlement request being generated by an initiator terminal of the fund settlement initiator and recorded on the blockchain; settlement request receiving code configured to cause at least one of the at least one processor to receive the settlement request based on querying; and settlement result on-chaining code configured to cause at least one of the at least one processor to generate a settlement result of a settlement performed according to the settlement request and record the settlement result on the blockchain.

According to one aspect of an example embodiment of the disclosure, provided is a device, including: a memory, storing computer-readable instructions; and a processor, reading the computer-readable instructions stored in the memory, to perform the method described above.

According to one aspect of an example embodiment of the disclosure, provided is a non-transitory computer-readable storage medium, storing computer-readable instructions, the computer-readable instructions, when executed by a processor of a computer, causing the computer to perform the method described above.

BRIEF DESCRIPTION OF THE DRAWINGS

The above and other aspects, features, and advantages of certain example embodiments of the disclosure will be more apparent from the following description taken in conjunction with the accompanying drawings. The accompanying drawings in the following descriptions show merely the embodiments of the disclosure, and a person of ordinary skill in the art may still derive other accompanying drawings from the accompanying drawings without creative efforts.

DETAILED DESCRIPTION

Figure 1A:
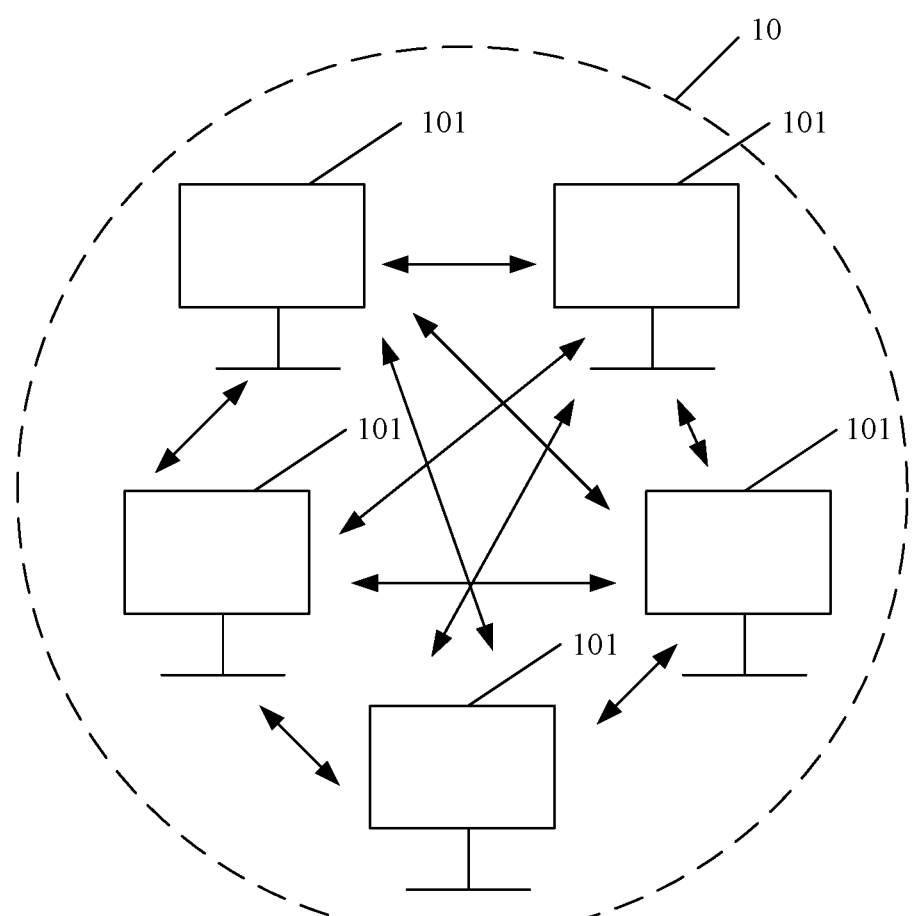
FIG. 1A to FIG. 1D are diagrams of four system architectures that are applicable in a data processing method in a blockchain fund settlement system according to example embodiments of the disclosure.

Example implementations are now described more comprehensively with reference to the accompanying drawings. However, the example implementations may be implemented in various forms, and it is not to be understood as being limited to the examples described herein. The example implementations are provided to make the descriptions of the disclosure more comprehensive and complete, and comprehensively convey the idea of the example implementations to a person skilled in the art. The accompanying drawings are merely schematic illustrations of the disclosure and are not necessarily drawn to scale. A same reference numeral in the accompanying drawings represents same or similar components, and therefore repeated descriptions of the components are omitted.

In addition, the described features, structures, or characteristics may be combined in one or more example implementations in any suitable manner. In the following descriptions, more specific details are provided to provide full understanding of the example implementations of the disclosure. However, a person skilled in the art may know that, the technical solutions of the disclosure may be practiced while omitting one or more of the specific details, or may be practiced by using other methods, components, or steps. In other situations, structures, methods, implementations, or operations that are publicly known are not shown or described in detail to prevent from making the aspects of the disclosure obscure.

Some block diagrams shown in the accompanying drawings are functional entities and are not necessarily corresponding to physically or logically independent entities. Such functional entities may be implemented in the form of software, or implemented in one or more hardware modules or integrated circuits, or implemented in different networks and/or processor apparatuses and/or micro-controller apparatuses.

System architectures to which an example embodiment of the disclosure may be applied are first described below with reference to FIG. 1A to FIG. 1D.

FIG. 1A shows a system architecture of a blockchain network to which an example embodiment of the disclosure may be applied. The blockchain network 10 includes accounting nodes 101. When one accounting node 101 receives information to be on-chained, the accounting node temporarily stores the information to be on-chained in a cache, and after the information to be on-chained stored in the cache reaches a preset package requirement, the accounting node 101 packs the information to be on-chained in the cache into a data block, and sends the data block to other accounting nodes 101 for consensus. The information to be on-chained refers to information to be recorded on the blockchain, and accordingly, on-chaining refers to recording the information on the blockchain. After the accounting nodes 101 achieve a consensus, the data block is recorded on the blockchain to complete on-chaining. In a blockchain fund settlement system according to an embodiment of the disclosure, a fund settlement initiator, a fund settlement recipient, and a settlement institution terminal may be used as the accounting nodes 101 to reach consensus on the information to be on-chained and on-chain the information (including settlement requests, settlement results, and query requests).

The settlement institution terminal in an example embodiment of the disclosure may be a data processing device. In addition, the fund settlement initiator, the fund settlement recipient, and nodes of other parties in the blockchain fund settlement system may alternatively perform the corresponding method by using the data processing device. The data processing device may be a terminal or a server. The terminal may be, for example, a smartphone, a computer, a personal digital assistant (PDA), a tablet computer, a point of sales (POS), or an on-board computer. The server may be an independent server, or may be a server in a cluster.

Figure 1B:
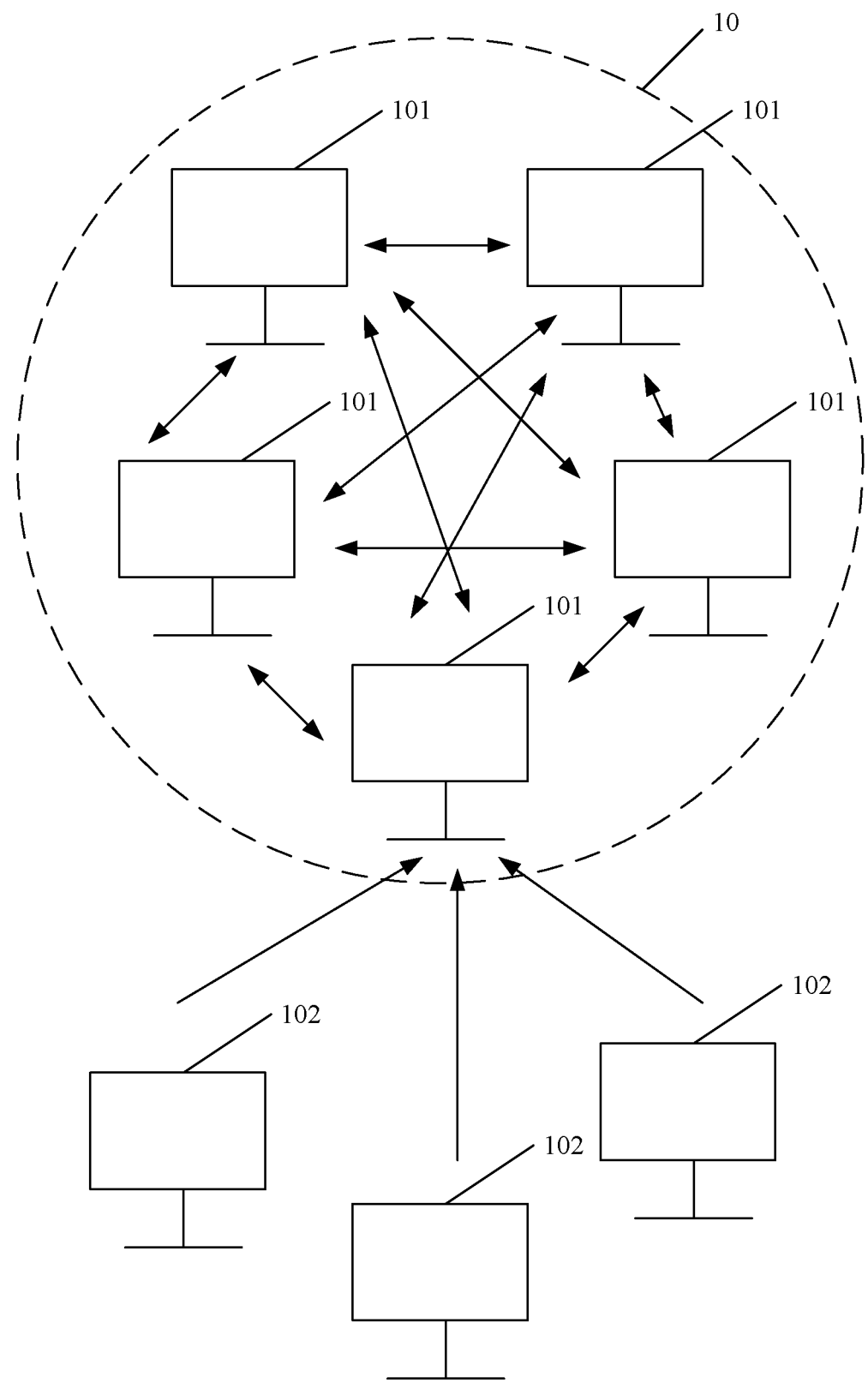

FIG. 1B shows a system architecture of another blockchain network to which an example embodiment of the disclosure may be applied. The blockchain network 10 includes accounting nodes 101 and nodes 102 for generating information to be on-chained. The accounting nodes 101 are configured to reach a consensus on the information to be on-chained generated by the node 102 and on-chain the information; and the node 102 is configured to generate service-related information to be on-chained, and send the generated information to be on-chained to the accounting node 101. In the blockchain network in this system architecture, the node 102 for generating information to be on-chained cannot perform verification on on-chain information on the blockchain. In a blockchain fund settlement system according to an embodiment of the disclosure, a fund settlement initiator, a fund settlement recipient, and a settlement institution terminal may be used as the nodes 102 to generate the information to be on-chained (including settlement requests, settlement results, and query requests).

Figure 1C:
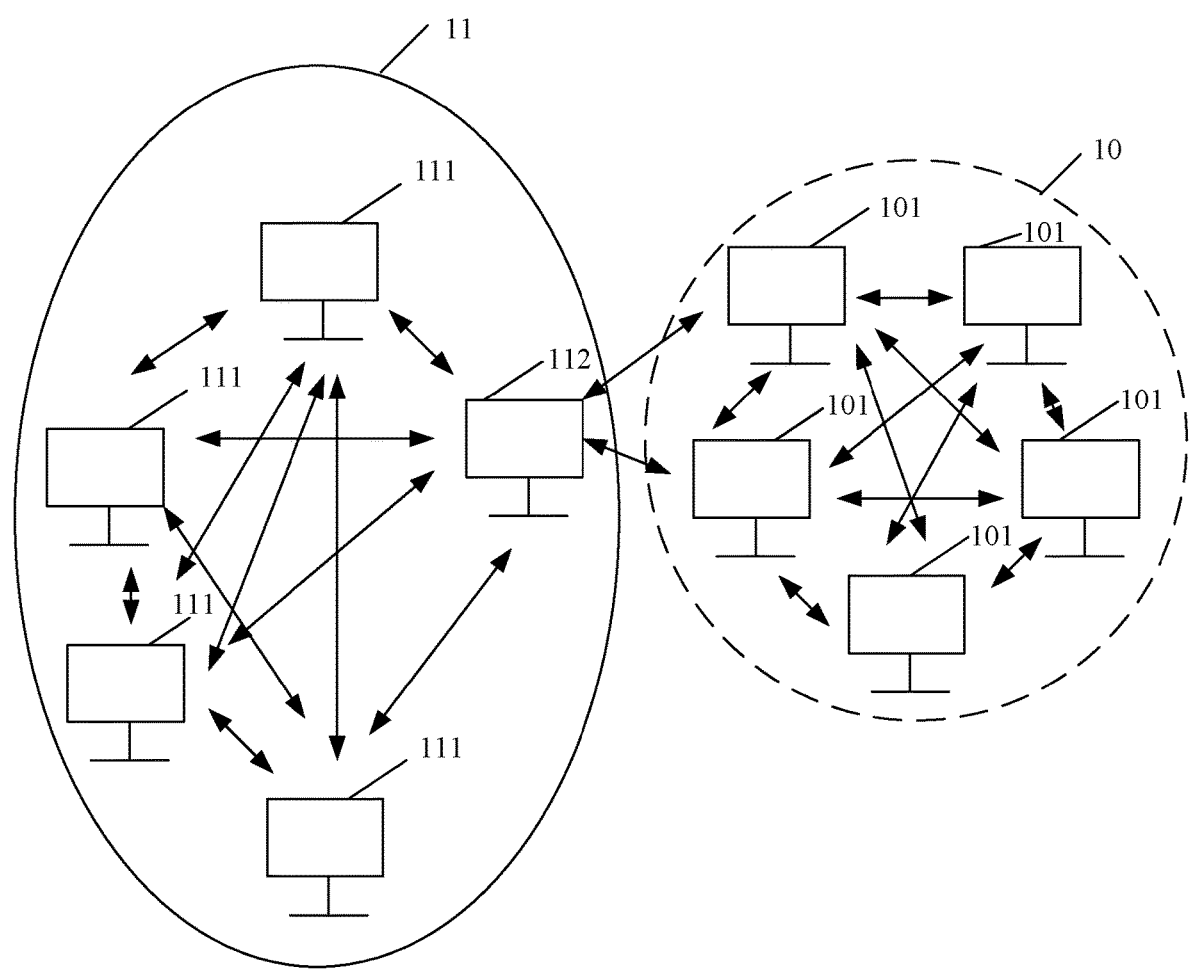

FIG. 1C shows a system architecture of another blockchain network to which an example embodiment of the disclosure may be applied. The blockchain network includes an accounting subnetwork 10 and a service subnetwork 11. The accounting subnetwork 10 includes accounting nodes 101, and the service subnetwork 11 includes service nodes 111 and a proxy node 112. The accounting nodes 101 in the accounting subnetwork 10 are configured to reach a consensus on information to be on-chained and on-chain a data block formed by information to be on-chained; and the service node 111 in the service subnetwork 11 is configured to generate service-related information to be on-chained. The proxy node 112 is a special service node and is configured to send the information to be on-chained generated by the service node 111 to the accounting node 101. Compared with the blockchain network in the system architecture shown in FIG. 1B, the service node 111 of the blockchain network in this system architecture may perform verification on on-chain information on the blockchain. The verification may include the following process: after on-chaining the data block, the accounting node 101 returns a block header to the service node 111, the block header including a digest and a signature of the data block; the service node 111 performs signature verification on the digest and the signature after receiving the block header. In a blockchain fund settlement system according to an embodiment of the disclosure, a fund settlement initiator, a fund settlement recipient, and a settlement institution terminal may be used as the service nodes 111 to generate the information to be on-chained (including settlement requests, settlement results, and query requests).

Figure 1D:
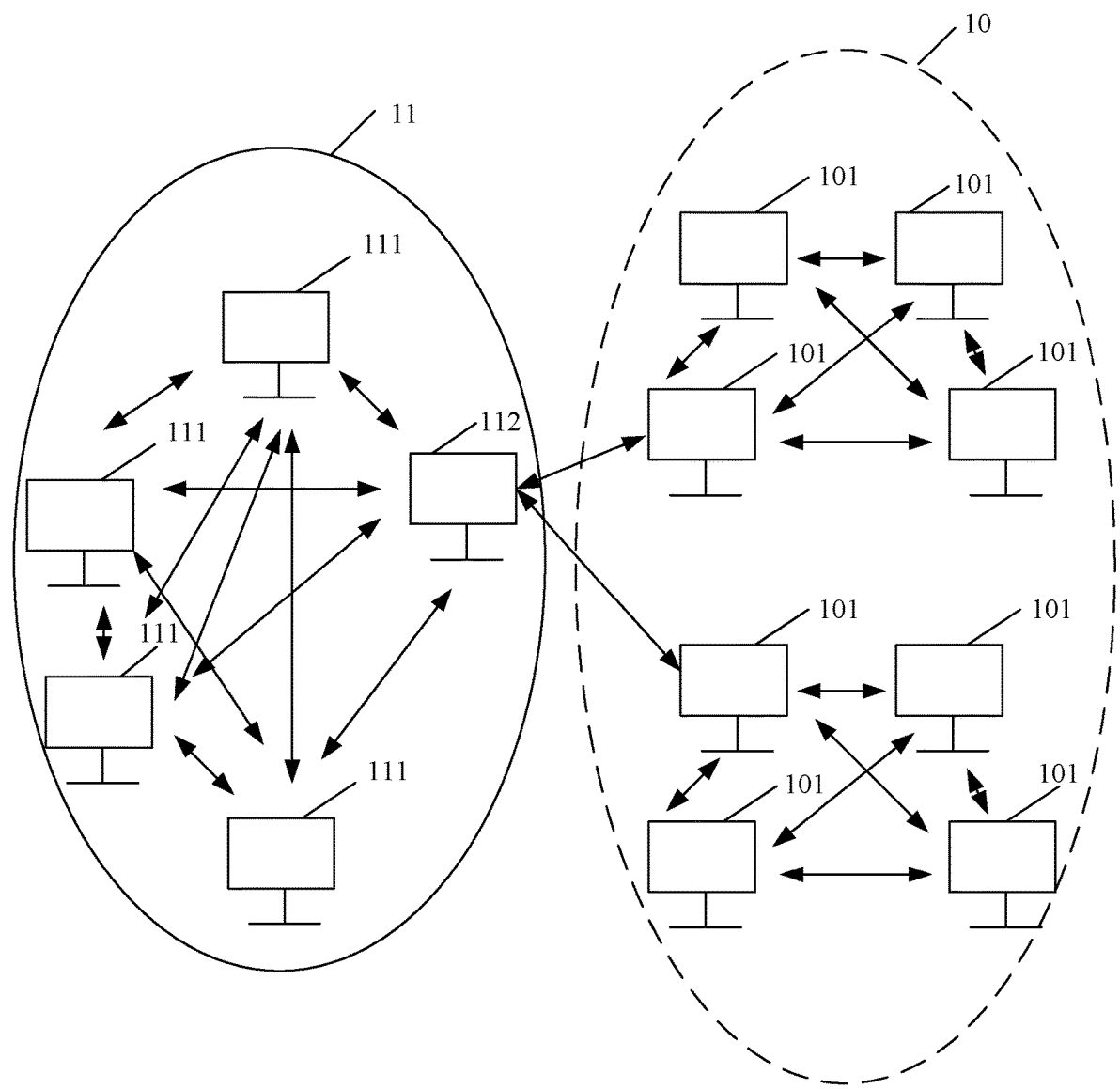

FIG. 1D shows a system architecture of another blockchain network to which an example embodiment of the disclosure may be applied. The blockchain network includes an accounting subnetwork 10 and a service subnetwork 11. The accounting subnetwork 10 includes accounting nodes 101, and the service subnetwork 11 includes service nodes 111 and a proxy node 112. The accounting subnetwork 10 includes a plurality of branch accounting subnetworks, and the accounting nodes 101 in each branch accounting subnetwork are responsible for reaching a consensus on a specific type of information to be on-chained and on-chain the specific type of information. For example, a settlement request generated by a fund settlement initiator needs to be recorded on the blockchain, and a settlement result generated by a settlement institution terminal also needs to be recorded on the blockchain. In this case, for ease of management of the information to be on-chained, the accounting nodes in one branch accounting subnetwork are specifically responsible for reaching a consensus on and on-chaining the settlement request; and the accounting nodes in another branch accounting subnetwork are specifically responsible for reaching a consensus on and on-chaining the settlement result. In a blockchain fund settlement system according to an embodiment of the disclosure, the fund settlement initiator, a fund settlement recipient, and the settlement institution terminal may be used as the service nodes 111 to generate the information to be on-chained (including settlement requests, settlement results, and query requests).

Description is made below by using an example in which the nodes of all parties such as the initiator, the recipient, and the settlement institution terminal in the blockchain fund settlement system are all terminals (or terminal devices).

Figure 2:
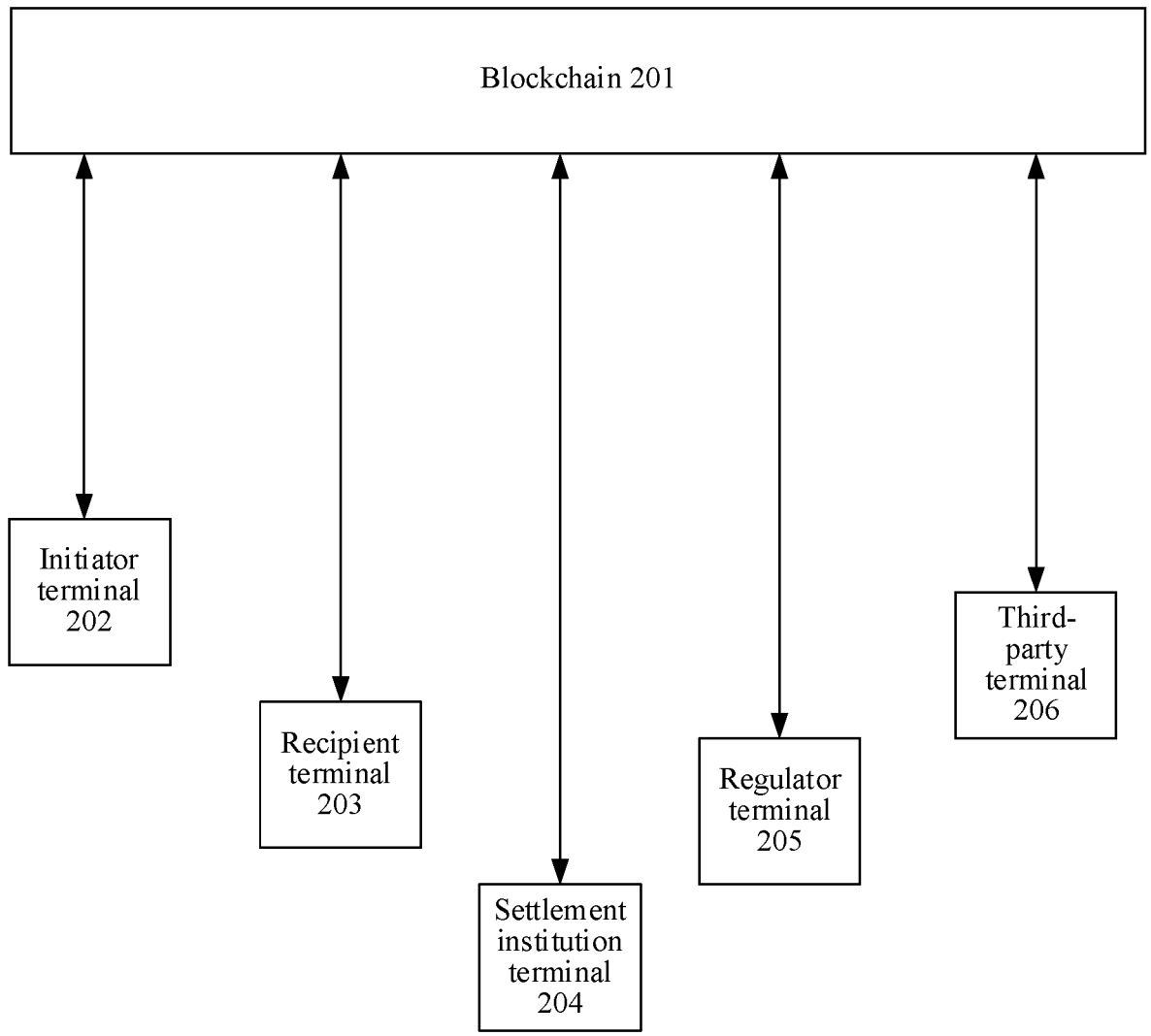
FIG. 2 is a diagram of a scenario architecture of a blockchain fund settlement system according to an example embodiment of the disclosure.

FIG. 2 is a scenario architectural diagram of a blockchain fund settlement system according to an embodiment of the disclosure.

Fund settlement includes a service as follows: asset holders perform settlement of mutual fund account dealings or debiting between each other. For example, a company A signs a contract with a company B, where the company B is to constructs a mall for the company A. During construction of the mall, the company A needs to transfer project funds to the company B in each quarter, to support the company B to successfully construct the mall. Therefore, at the end of each quarter, the company A needs to perform fund settlement, to transfer, to the company B, the funds owed to the company B in this quarter. A behavior of clearing debiting between asset holders is the fund settlement, and the fund settlement needs to be performed through a formal fund settlement institution, such as a bank.

In an example of the blockchain fund settlement system, as shown in FIG. 2, the blockchain fund settlement system includes a blockchain 201, an initiator terminal 202, a recipient terminal 203, a settlement institution terminal 204, a regulator terminal 205, and a third-party terminal 206. During debiting between the initiator and the recipient, and when fund settlement is performed, the initiator terminal 202 records a settlement request on the blockchain 201, for the settlement institution terminal 204 to obtain the settlement request from the blockchain 201, so as to perform offline fund settlement according to the settlement request. After the fund settlement is completed, the settlement institution terminal 204 records a settlement result on the blockchain 201, such that the recipient terminal 203, the regulator terminal 205, and the third-party terminal 206 may obtain the settlement result from the blockchain 201.

Figure 3A:
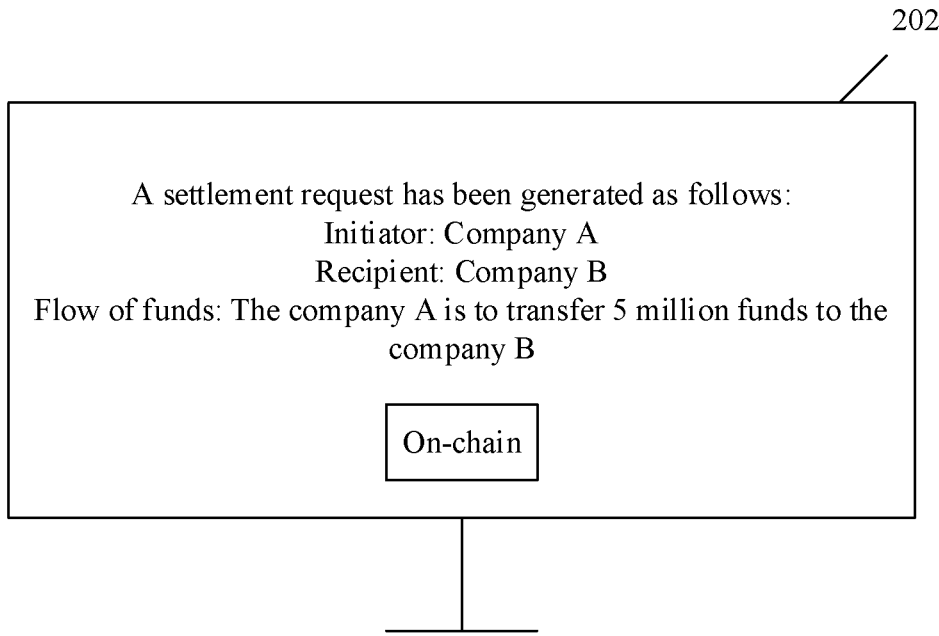
FIG. 3A to FIG. 3T are diagrams of display interfaces of node terminals in a blockchain fund settlement system according to example embodiments of the disclosure.
Figure 3B:
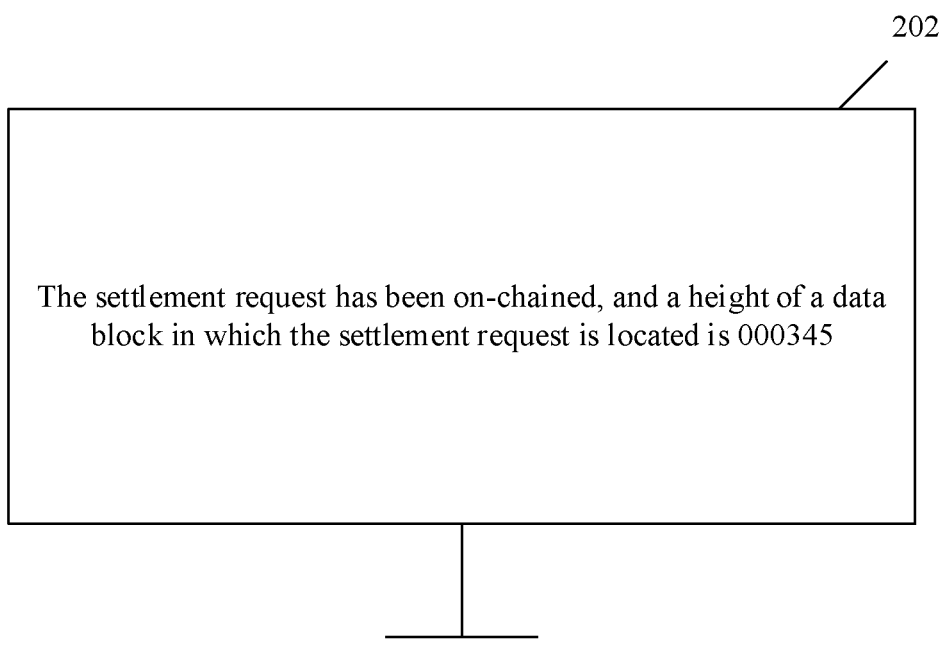
Figure 3C:
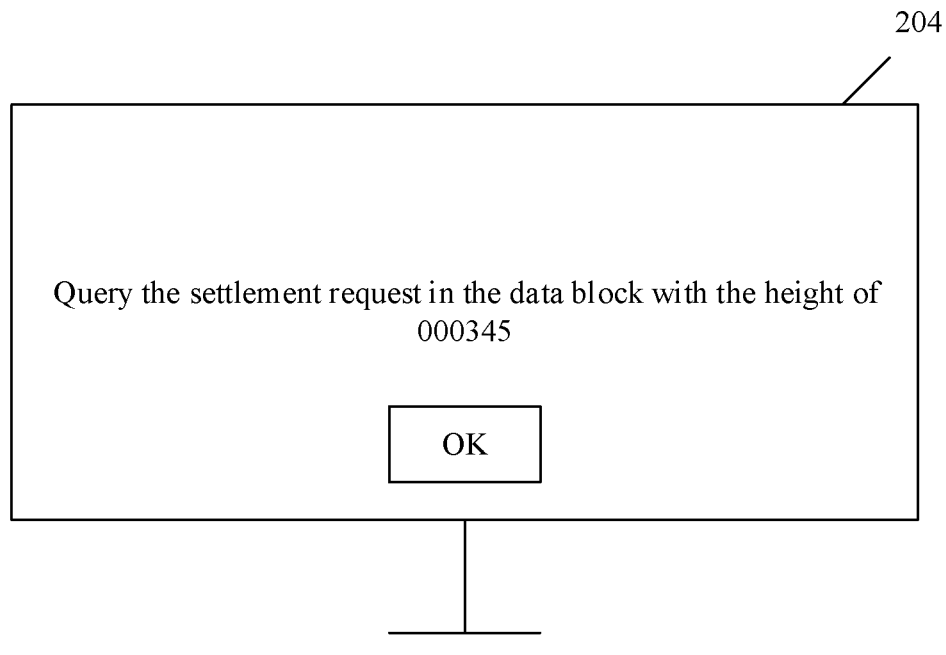
Figure 3D:
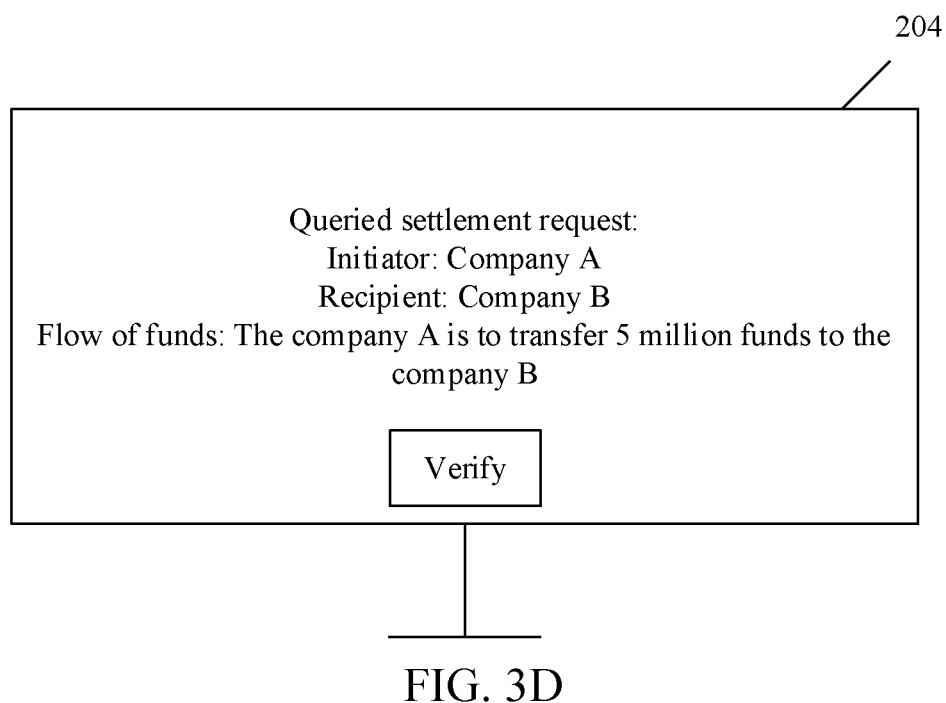
Figure 3E:
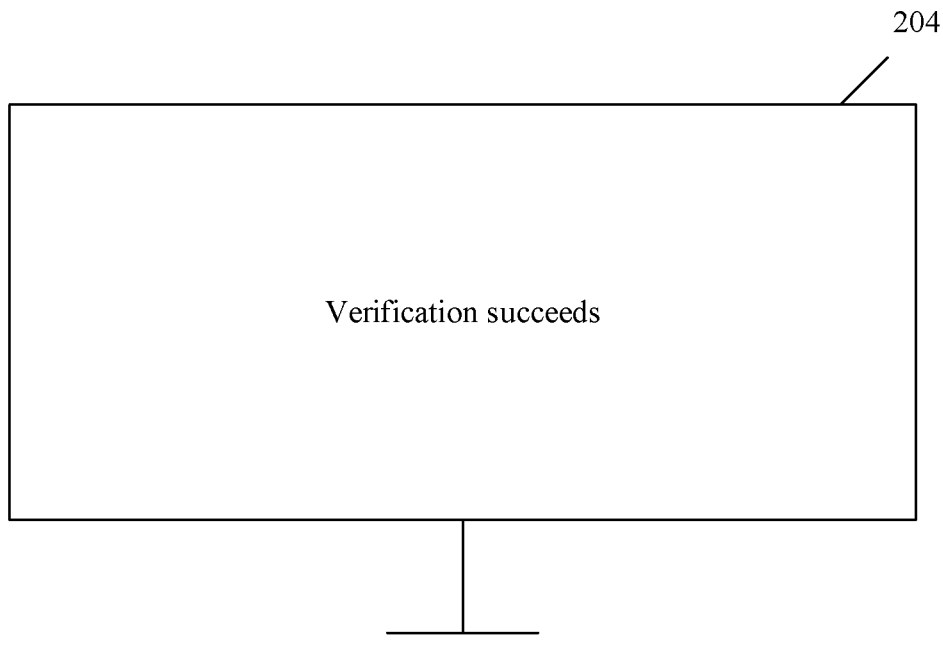
Figure 3F:
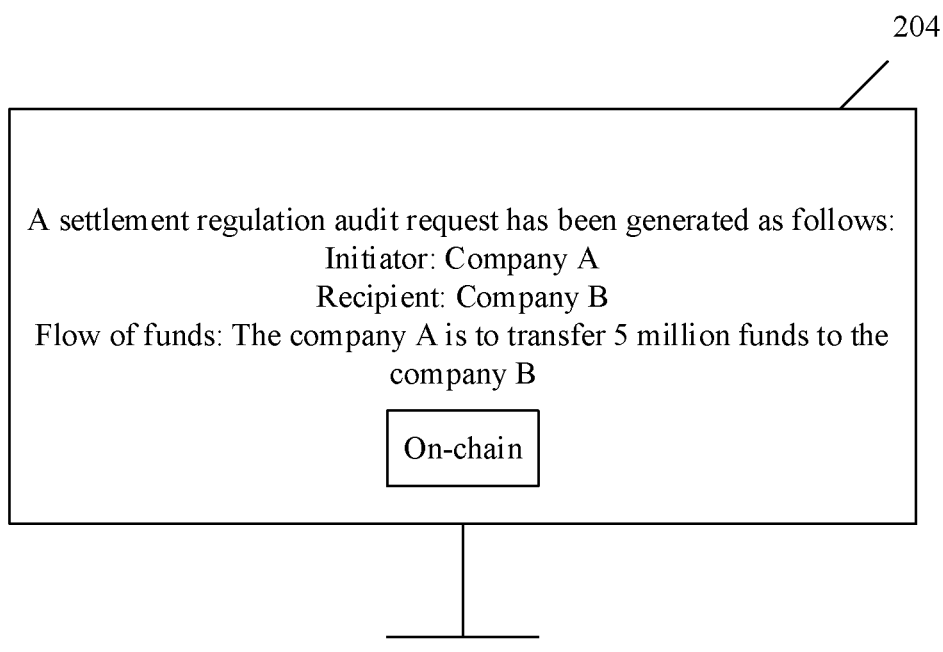
Figure 3G:
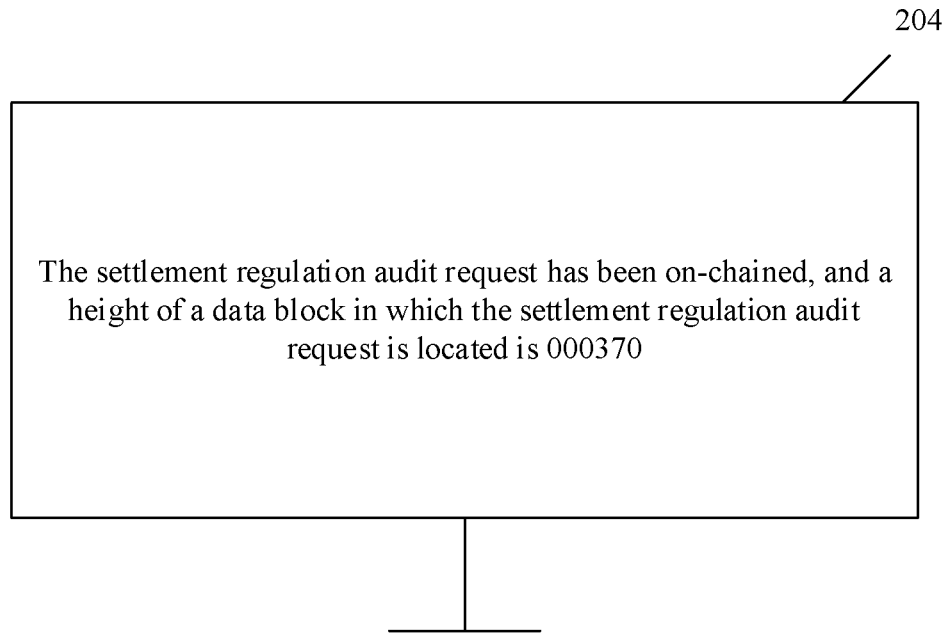
Figure 3H:
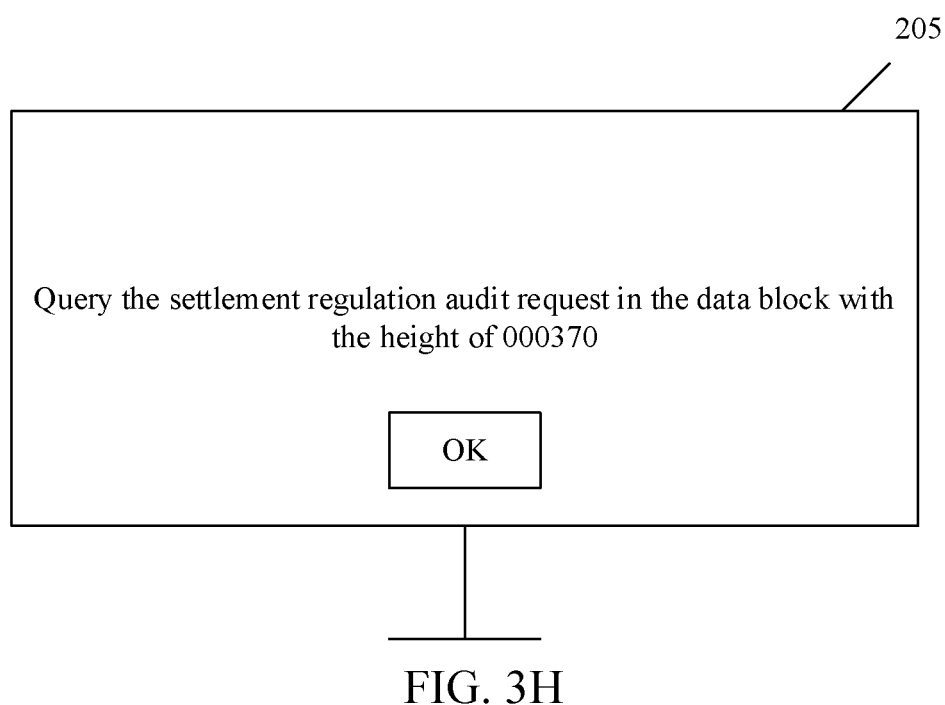
Figure 3I:
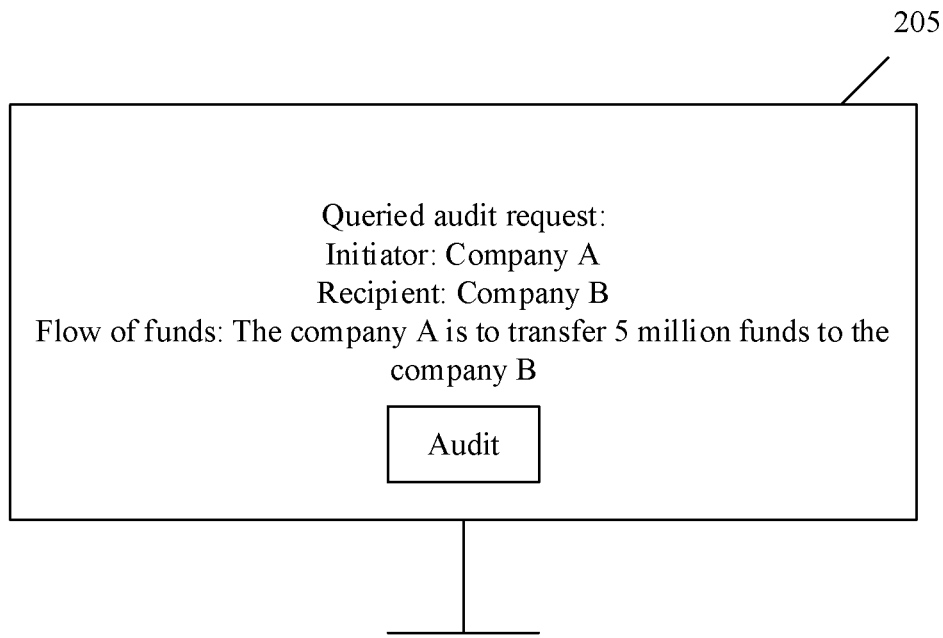
Figure 3J:
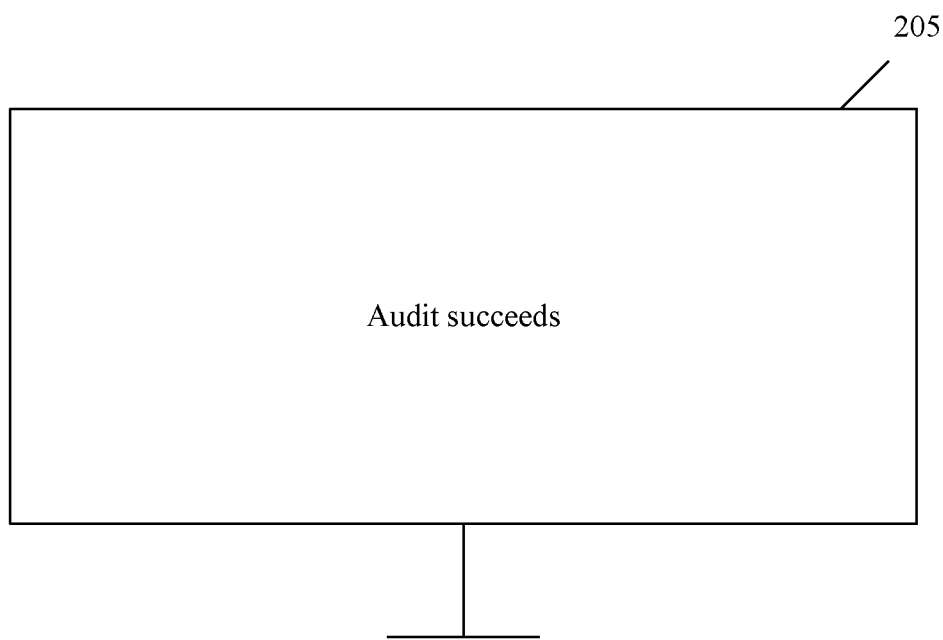
Figure 3K:
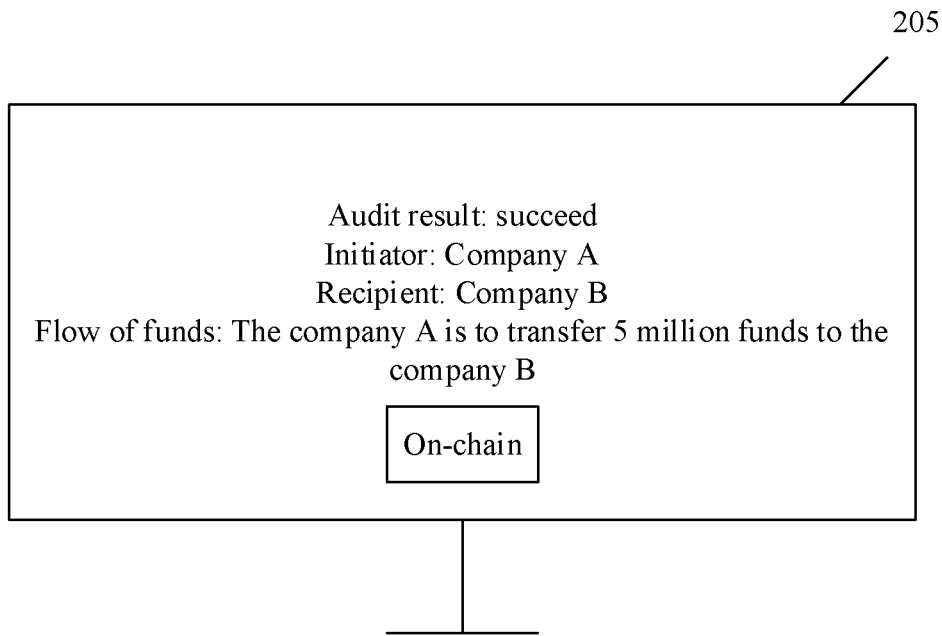
Figure 3L:
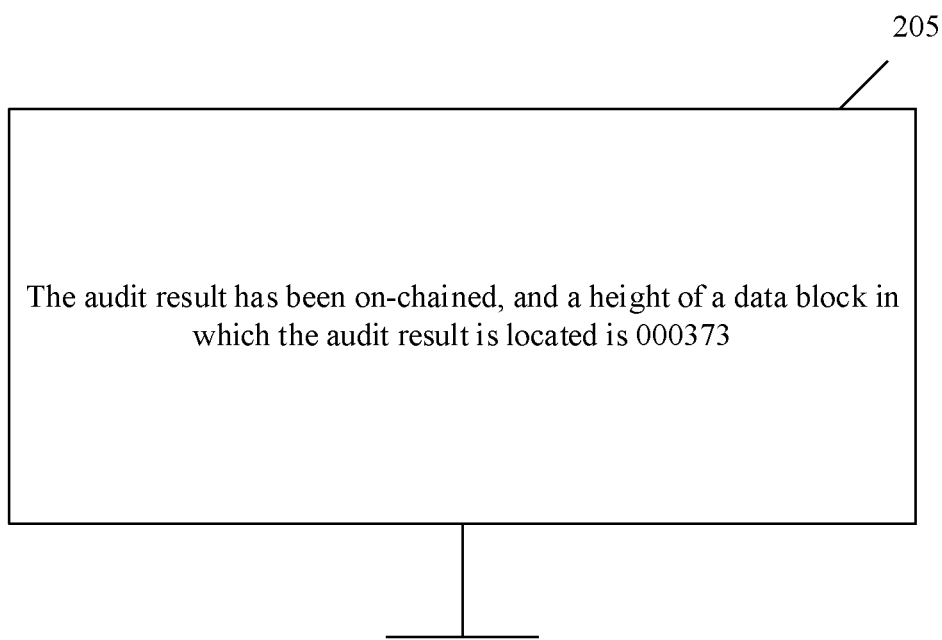
Figure 3M:
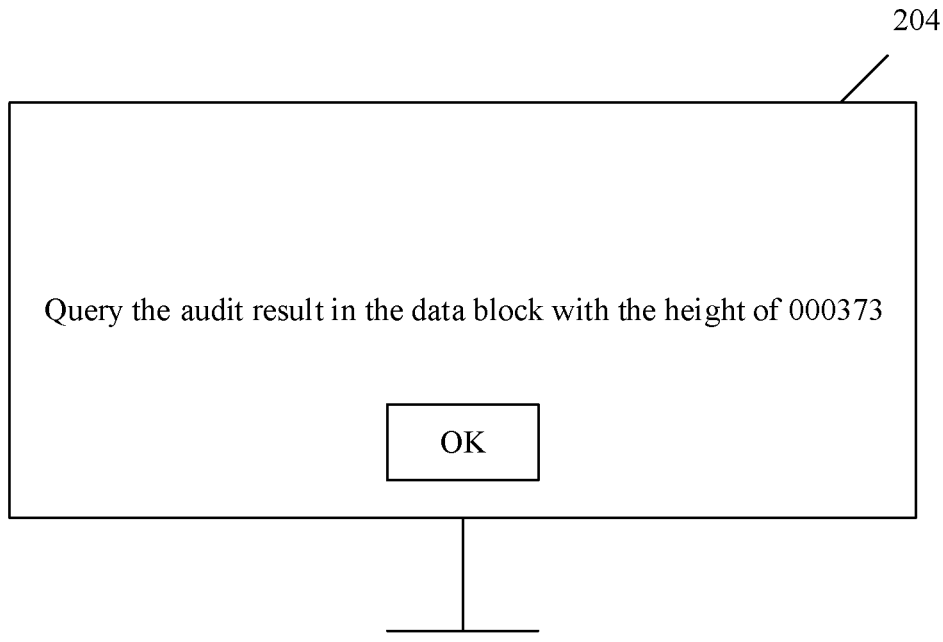
Figure 3N:
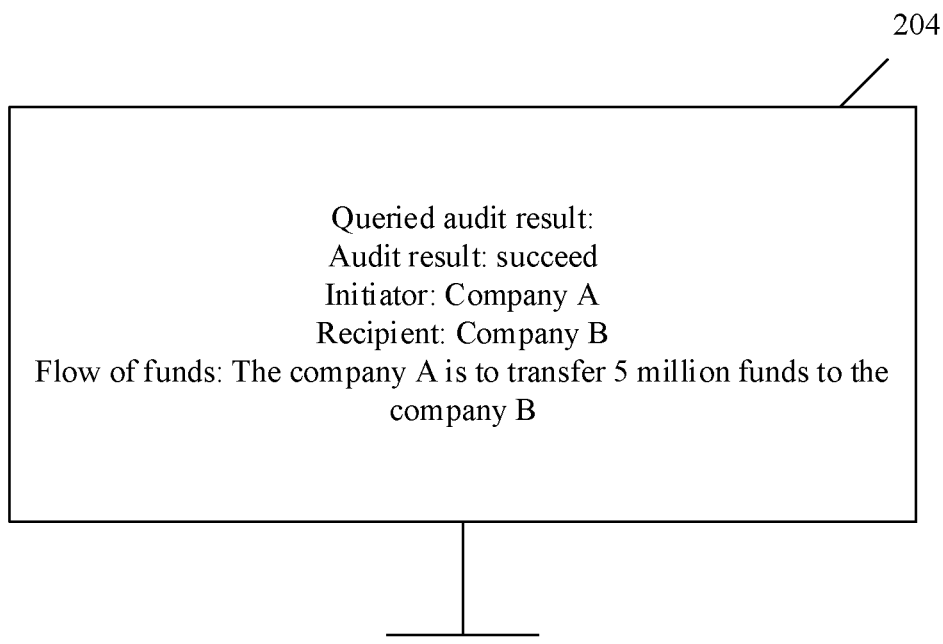
Figure 3O:
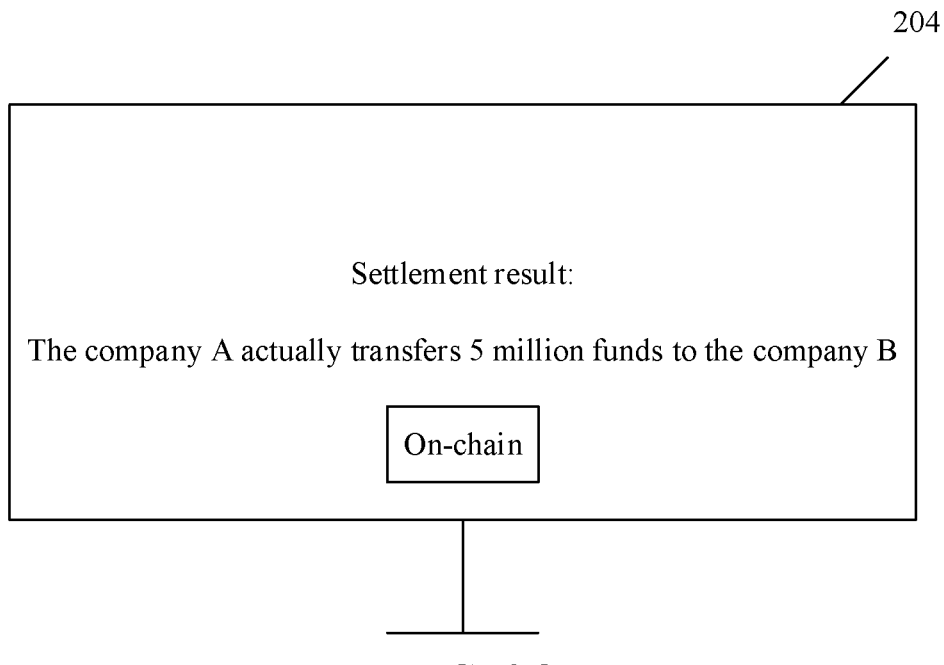
Figure 3P:
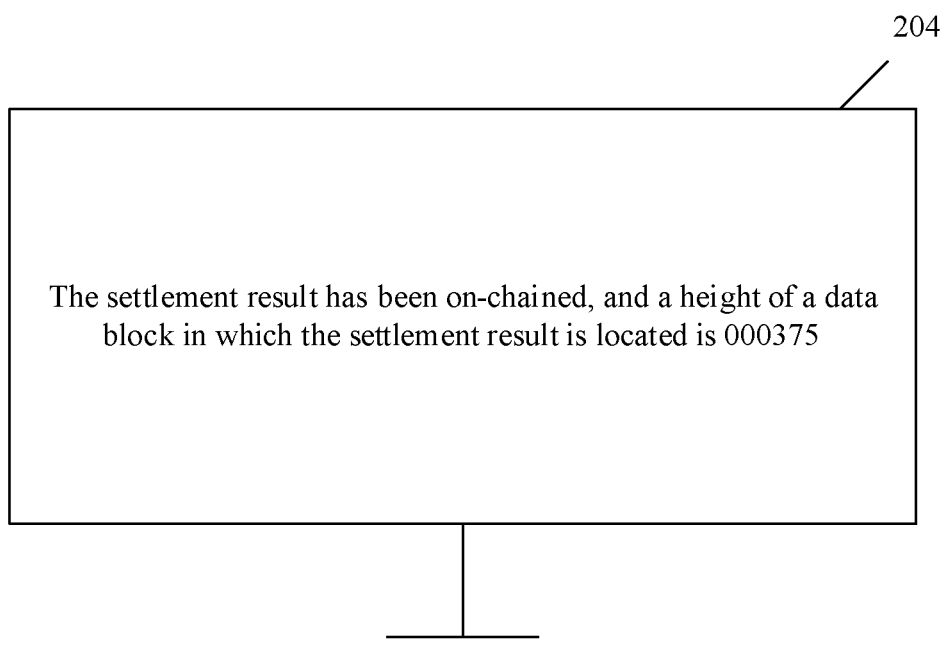
Figure 3Q:
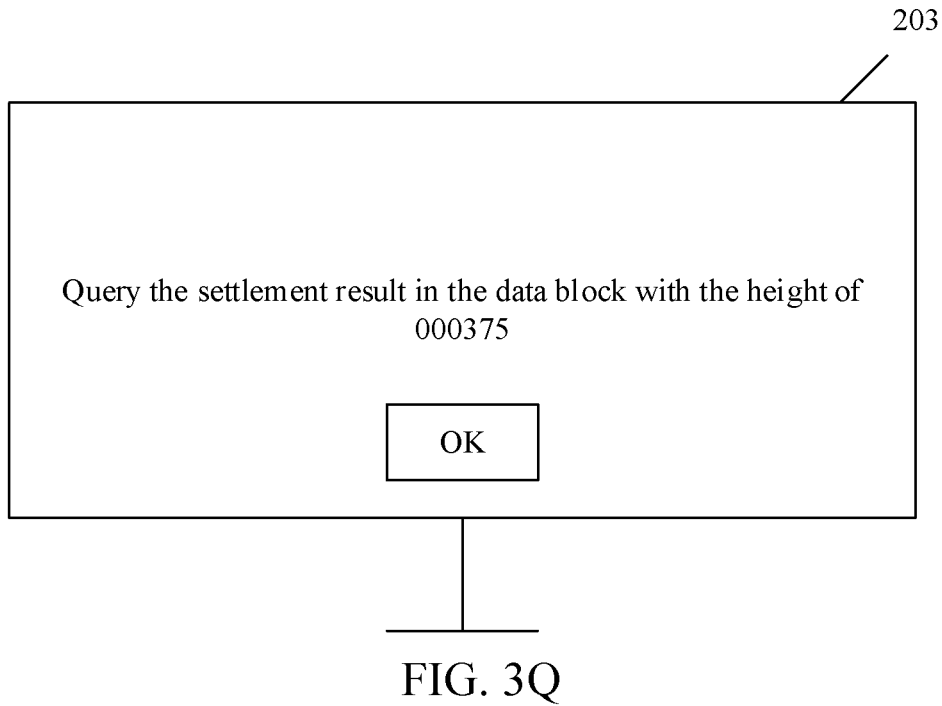
Figure 3R:
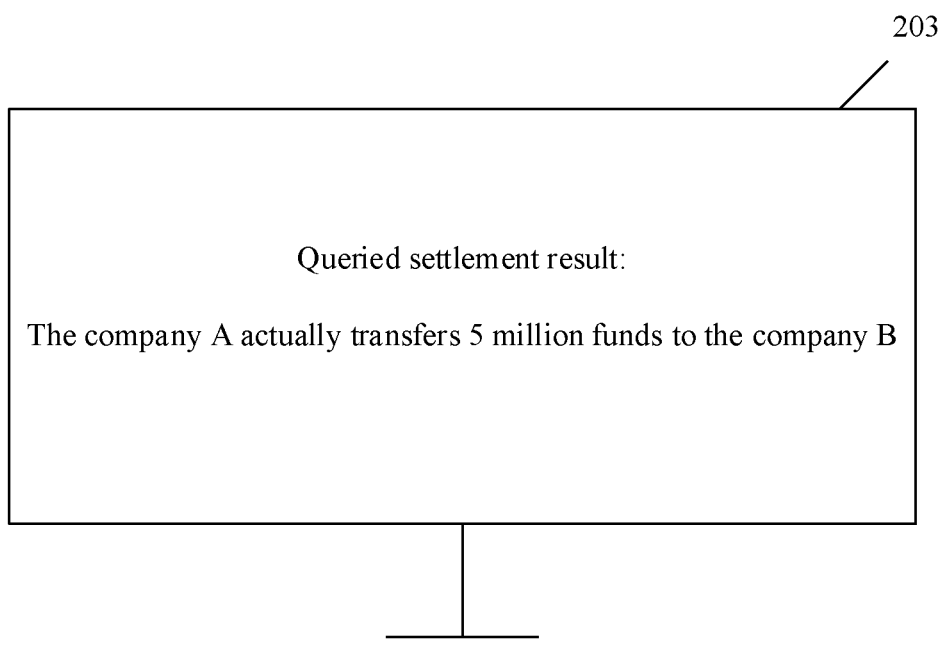
Figure 3S:
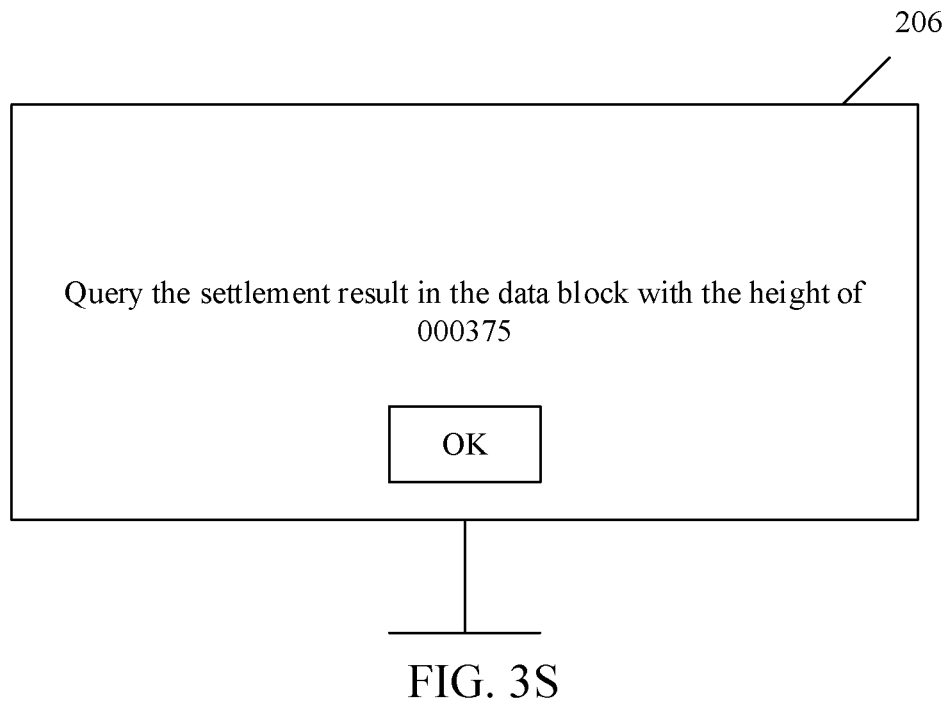
Figure 3T:
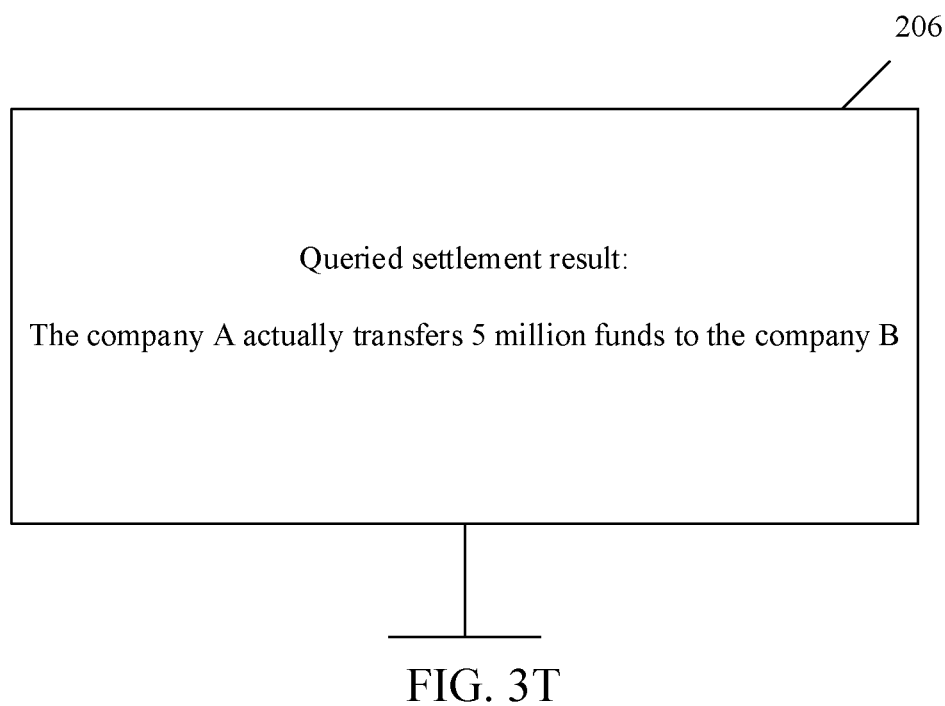

The following describes a general process of accounting and witnessing in a fund settlement system with reference to FIG. 3A to FIG. 3T, and FIG. 3A to FIG. 3T are diagrams of display interfaces of node terminals in a blockchain fund settlement system according to an embodiment of the disclosure.

As shown in FIG. 3A, a company A serves as a fund settlement initiator, a company B serves as a fund settlement recipient, and a flow of funds is as follows: the company A is to transfer 5 million funds to the company B, and the fund settlement needs to be performed through a settlement institution. During the fund settlement, after a personnel of the initiator inputs the settlement request, the personnel clicks an "On-chain" option, to record the settlement request on a blockchain.

After the settlement request is on-chained, as shown in FIG. 3B, the initiator terminal 202 displays obtained height information of a data block in which the settlement request is located.

After the height information of the data block in which the settlement request is located is obtained, a personnel of the settlement institution inputs information shown in FIG. 3C into the settlement institution terminal 204 and clicks an "Ok" option.

As shown in FIG. 3D, after finding the settlement request, the settlement institution terminal 204 displays the queried settlement request, and the personnel of the settlement institution clicks a "Verify" option in the settlement institution terminal 204. If the verification succeeds, as shown in FIG. 3E, "Verification succeeds" is displayed on the settlement institution terminal 204.

As shown in FIG. 3F, the settlement institution terminal 204 generates a settlement regulation audit request, and an "On-chain" option is clicked to record the settlement regulation audit request on the blockchain. After the settlement regulation audit request is on-chained, as shown in FIG. 3G, an interface of the settlement institution terminal 204 displays obtained height information of a data block in which the settlement regulation audit request is located.

After the height information of the data block in which the settlement regulation audit request is located is obtained, a personnel of the regulator inputs information shown in FIG. 3H into the regulator terminal 205 and clicks an "Ok" option.

As shown in FIG. 3I, after finding the settlement regulation audit request, the regulator terminal 205 displays the settlement regulation audit request, and the personnel of the regulator clicks an "Audit" option in the regulator terminal 205. If the audit succeeds, as shown in FIG. 3J, "Audit succeeds" is displayed in the regulator terminal 205.

As shown in FIG. 3K, the regulator terminal 205 generates an audit result, and an "On-chain" option is clicked to record the audit result on the blockchain. After the audit result is on-chained, as shown in FIG. 3L, the regulator terminal 205 displays obtained height information of a block in which the audit result is located.

After the height information of the block in which the audit result is located is obtained, the personnel of the settlement institution inputs information shown in FIG. 3M into the settlement institution terminal 204 and clicks an "Ok" option. After the audit result is queried, as shown in FIG. 3N, the settlement institution terminal 204 displays the audit result.

After determining that the audit succeeds, the personnel of the settlement institution performs offline fund settlement according to the settlement request, generates a settlement result on the settlement institution terminal 204, and as shown in FIG. 3O, clicks an "On-chain" option to record the settlement result on the blockchain.

After the settlement result is on-chained, as shown in FIG. 3P, the settlement institution terminal 204 receives height information of a data block in which the settlement result is located.

After the height information of the data block in which the settlement result is located is obtained, as shown in FIG. 3Q, a personnel of the recipient queries the settlement result in the recipient terminal 203 and clicks an "Ok" option. After the settlement result is queried, as shown in FIG. 3R, the recipient terminal 203 displays the settlement result.

After the height information of the data block in which the settlement result is located is obtained, as shown in FIG. 3S, a personnel of the third party queries the settlement result in the third-party terminal 206 and clicks an "Ok" option. After the settlement result is queried, as shown in FIG. 3T, the third-party terminal 206 displays the settlement result.

Figure 4:
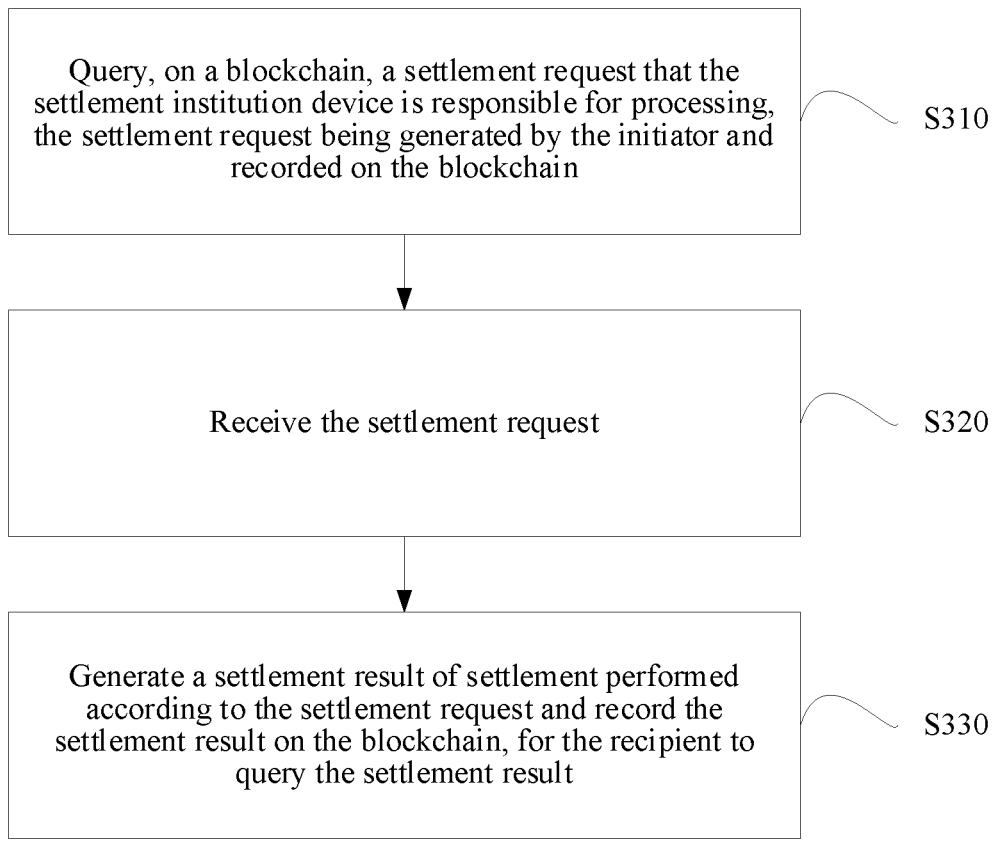
FIG. 4 is a flowchart of a data processing method in a blockchain fund settlement system according to an example embodiment of the disclosure.

As shown in FIG. 4, according to an embodiment of the disclosure, a data processing method in a blockchain fund settlement system is provided. The blockchain fund settlement system is a transparent regulatory system that records information related to fund settlement on a blockchain and queries information on the blockchain to implement the fund settlement. As shown in FIG. 2, the blockchain fund settlement system includes a blockchain 201 recording information related to fund settlement, a fund settlement initiator terminal 202, a fund settlement recipient terminal 203, a settlement institution terminal 204 responsible for processing the fund settlement, a regulator terminal 205 regulating the fund settlement, and a third-party terminal 206 related to the fund settlement. The method is performed by the settlement institution terminal 204, and the method includes the following operations:

Operation 310. Query, on a blockchain, a settlement request that the settlement institution terminal is responsible for processing, the settlement request being generated by the initiator terminal and recorded on the blockchain.

Operation 320. Receive the settlement request.

Operation 330. Generate a settlement result of settlement performed according to the settlement request and record the settlement result on the blockchain, for the recipient terminal to query the settlement result.

The following describes a process of operations 310 to 330 in blockchain architectures shown in FIG. 1A to FIG. 1C.

In operation 310, the settlement request that the settlement institution terminal is responsible for processing is queried on the blockchain, and the settlement request is generated by the initiator terminal and recorded on the blockchain.

The settlement request refers to information generated by the initiator terminal and used for requesting fund settlement.

A process of the entire fund settlement needs to be disclosed on the blockchain to ensure the transparency and undeniability of the fund settlement. Therefore, all information that needs to be witnessed in the fund settlement process, for example, the settlement request and the settlement result, needs to be recorded on the blockchain. Therefore, after the initiator terminal generates the settlement request, the settlement request is not sent to the settlement institution terminal but sent to the blockchain for recording, so that nodes that need to query the settlement request may query the settlement request on the blockchain.

The following describes a process of querying, on the blockchain, the settlement request that the settlement institution terminal is responsible for processing in a case that the settlement institution terminal obtains an identifier of a settlement request data block.

In an embodiment, operation 310 of querying a settlement request may include:

querying, according to the identifier of the settlement request data block, the settlement request data block on the blockchain, the settlement request data block including the settlement request; and obtaining the settlement request from the settlement request data block.

An identifier of a data block refers to information that may uniquely identify the data block, such as a block height or a block hash value.

The settlement request data block refers to a blockchain data block in which the settlement request is located.

In an embodiment, the identifier of the settlement request data block refers to at least one of the block height and the block hash value.

In a blockchain, each data block has a corresponding unique data block height according to an on-chaining sequence of the data block on the blockchain. Additionally, different data blocks include different data information. A hash value of a data block is obtained by performing hash operation on all data information included in the data block. According to mathematic characteristics of the hash operation, as long as data information included in two data blocks is not exactly the same, it may be considered that block hash values of the two data blocks are definitely different. That is, each data block corresponds to a unique data block hash value. Therefore, at least one of the block height and the block hash value may be used as the identifier of the data block, so that each node in the fund settlement system may find the unique data block on the blockchain according to the obtained identifier of the data block.

An advantage of an example embodiment lies in that, the settlement institution terminal may accurately and uniquely find, on the blockchain according to the identifier of the settlement request data block, the data block in which the settlement request that the settlement institution terminal is responsible for processing is located.

The following describes a process of the settlement institution terminal obtaining the identifier of the settlement request data block.

In an embodiment, before the querying, according to the identifier of the settlement request data block, the settlement request data block on the blockchain, the process includes:

receiving the identifier of the settlement request data block from the initiator terminal, where after the settlement request data block is recorded on the blockchain, the initiator terminal obtains the identifier of the settlement request data block and notifies the settlement institution terminal.

In an example embodiment, the initiator terminal sends the generated settlement request to the blockchain. After the settlement request data block in which the settlement request is located is on-chained (where on-chaining refers to recording information/a data block on the blockchain; accordingly, information recorded on the blockchain is on-chain information, and the data block recorded on the blockchain is an on-chain block), the blockchain returns the identifier (block height/block hash value) of the settlement request data block to the initiator terminal. Once the initiator terminal receives the identifier of the settlement request data block, the initiator terminal sends the identifier of the settlement request data block to the settlement institution terminal, such that the settlement institution terminal may query the corresponding settlement request from the blockchain according to the identifier of the settlement request data block.

An advantage of an example embodiment lies in that, the identifier of the settlement request data block is automatically notified to the settlement institution terminal by the initiator terminal after the settlement request data block is on-chained, so that the settlement institution terminal may immediately perform settlement, thereby improving a settlement speed.

In an embodiment, before the querying, according to the identifier of the settlement request data block, the settlement request data block on the blockchain, the process further includes:
- periodically sending a request for obtaining the identifier of the settlement request data block to the initiator terminal; and
- receiving the identifier of the settlement request data block from the initiator terminal.

In an example embodiment, after the settlement request data block is on-chained and the initiator terminal obtains the identifier of the settlement request data block, the identifier of the settlement request data block is stored temporarily. The settlement institution terminal actively initiates a request for obtaining the identifier of the settlement request data block to the initiator terminal periodically (for example, every 5 minutes). After the initiator terminal receives the request initiated by the settlement institution terminal for obtaining the identifier of the settlement request data block, the initiator terminal sends the temporarily stored identifier of the settlement request data block to the settlement institution terminal, so that the settlement institution terminal may find the corresponding settlement request from the blockchain according to the identifier of the settlement request data block.

An advantage of an example embodiment lies in that, identifiers of settlement request data blocks may be accumulated and then transmitted together, thereby improving the network transmission efficiency.

The following describes a process of the settlement institution terminal obtaining the settlement request from the settlement request data block.

In an embodiment, the settlement request includes a settlement institution identifier, the settlement request data block includes a plurality of pieces of on-chain information, and the obtaining the settlement request from the settlement request data block includes:
- obtaining the settlement institution identifier and on-chain information corresponding to the settlement institution from the settlement request data block as the settlement request.

The on-chain information refers to a group of information included in a block body of a data block that has been on-chained. In an example embodiment, the settlement request recorded on the blockchain is one piece of on-chain information in the settlement request data block.

The settlement institution identifier refers to an identifier that may uniquely identify the settlement institution, such as a settlement institution number.

In an example embodiment, the settlement request sent by the initiator terminal to the blockchain includes information about the settlement institution specified to be responsible for processing the fund settlement, that is, the settlement institution identifier. Therefore, the settlement institution identifier is recorded in the settlement request data block and in the on-chain information corresponding to the settlement request. In this way, the settlement institution terminal may determine the on-chain information including the settlement institution identifier corresponding to the settlement institution in the settlement request data block as the settlement request that the settlement institution terminal is responsible for processing.

An advantage of an example embodiment lies in that, the settlement institution identifier is added to the on-chain settlement request, so that the settlement institution terminal may accurately query, according to the settlement institution identifier, the settlement request that the settlement institution terminal is responsible for processing.

The following describes a process of querying, on the blockchain, the settlement request that the settlement institution terminal is responsible for processing in a case that the settlement institution terminal does not obtain the identifier of the settlement request data block.

In an embodiment, the settlement request includes the settlement institution identifier, and the querying, on the blockchain, the settlement request that the settlement institution terminal is responsible for processing includes:
- obtaining, at intervals of a predetermined time period, a settlement request data block recorded on the blockchain in the predetermined time period; and
- querying the settlement request in the settlement request data block according to the settlement institution identifier.

In an example embodiment, the settlement institution terminal queries, at intervals of a predetermined time period (for example, every 5 mins), a newly on-chained settlement request data block in this time period on the blockchain. For the newly on-chained settlement request data blocks, the settlement institution terminal determines on-chain information including the settlement institution identifier corresponding to the settlement institution therein as settlement requests that the settlement institution terminal is responsible for processing.

An advantage of an example embodiment lies in that, the settlement institution terminal autonomously queries the settlement request from the blockchain, thereby alleviating the information transmission burden of the initiator terminal.

The following describes a process of packing (or configuring) the settlement request into the settlement request data block for on-chaining and correspondingly querying the settlement request from the settlement request data block.

In an embodiment, the settlement request includes the settlement institution identifier, and the on-chain information corresponding to the settlement request includes the settlement institution identifier and the settlement request encrypted by using a public key specific to the settlement institution corresponding to the settlement institution identifier in the settlement request. In this case, the querying the settlement request from the settlement request data block includes:
- obtaining the settlement institution identifier and the on-chain information corresponding to the settlement institution from the settlement request data block; and
- decrypting the on-chain information by using a private key specific to the settlement institution to obtain the settlement request.

In an example embodiment, a pair of keys, that is, a public key and a private key, are distributed to each node in the fund settlement system in advance through a key distribution center (KDC). The private key of each node is kept by the node itself, and the public key is stored in the KDC and may be obtained by all nodes in the fund settlement system. Identifiers of nodes corresponding to the public keys are correspondingly stored in the KDC with the public keys, such as a public key of the initiator terminal and an identifier of the initiator, and a public key of the settlement institution terminal and an identifier of the settlement institution. In this way, through the KDC, each node in the fund settlement system may obtain the public key of the node according to the identifier of the node, or obtain the identifier of the node according to the public key of the node.

In an example embodiment, after accounting nodes in a blockchain reach a consensus on a settlement request and before the settlement request is packed (or configured) in a data block for on-chaining, a settlement institution identifier is extracted from the settlement request. A public key corresponding to the settlement institution identifier, that is, a public key specific to the settlement institution, is obtained through the KDC. After settlement request information is encrypted by using the public key specific to the settlement institution, the encrypted settlement request and the settlement institution identifier are packed in a data block together and then on-chained. Since the encrypted settlement request is encrypted by using the public key specific to the settlement institution, only the specific settlement institution terminal may perform decryption by using its own private key, to obtain decrypted settlement request information.

In an example embodiment, the settlement institution terminal obtains the settlement institution identifier and on-chain information corresponding to the settlement institution from the settlement request data block. The settlement institution terminal decrypts the on-chain information by using the private key of the settlement institution terminal to obtain the settlement request included in the on-chain information.

An advantage of an example embodiment lies in that, the settlement request in the settlement request data block is on-chained after being encrypted. Therefore, even if the settlement request data block is obtained by a node without a specific key, content of the on-chain information cannot be read, thereby protecting the privacy of the settlement request in the on-chain information.

The following describes a process of the settlement institution terminal receiving the settlement request.

In operation 320, the settlement request is received.

Figure 5:
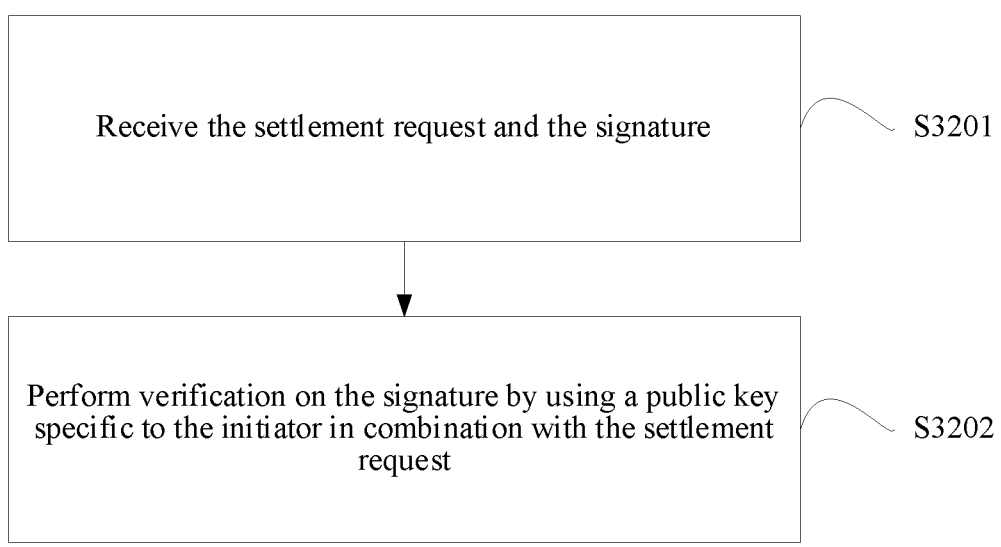
FIG. 5 is a flowchart of receiving a settlement request according to an example embodiment of the disclosure.

In an embodiment, the settlement request and a signature of the settlement request are together used as one piece of on-chain information in the settlement request data block and recorded on the blockchain. The signature of the settlement request is generated for the settlement request by the initiator terminal by using a private key specific to the initiator terminal. As shown in FIG. 5, operation 320 of receiving the settlement request may include the following operations:

Operation 3201. Receive the settlement request and the signature.

Operation 3202. Perform verification on the signature by using a public key specific to the initiator terminal in combination with the settlement request.

In an example embodiment, before sending the settlement request to the blockchain for on-chaining, the initiator terminal generates a signature for the settlement request by using a private key of the initiator terminal, and then sends the settlement request and the signature to the blockchain together. When the blockchain on-chains the settlement request, the signature and the settlement request are together packed in the settlement request data block as one piece of on-chain information and then on-chained.

In an example embodiment, after obtaining, from the settlement request data block, the settlement request that the settlement institution terminal is responsible for processing, the settlement institution terminal determines, from the settlement request, the initiator terminal of the settlement request. To determine whether the obtained settlement request in the on-chain information has been modified, the settlement institution terminal obtains the public key of the initiator terminal from the KDC, to perform verification on the signature of the settlement request in the on-chain information by using the public key. If the verification succeeds, it indicates that the settlement request in the on-chain information has not been modified; and if the verification fails, it indicates that the settlement request actually generated by the initiator terminal has been modified in the on-chaining process.

An advantage of an example embodiment lies in that, the signature is generated through encryption by using the private key of the initiator terminal, so that the accounting node in the blockchain cannot forge the signature without the private key of the initiator terminal. In this way, the settlement institution terminal may verify, according to the signature, whether the settlement request in the on-chain information is consistent with the settlement request actually generated by the initiator terminal.

In an embodiment, the signature is generated in the following manner:
  generating, by the initiator terminal, a digest of the settlement request by using a predetermined digest algorithm; and
  encrypting, by the initiator terminal, the digest by using the private key specific to the initiator terminal to obtain the signature.

In an embodiment, the performing verification on the signature by using a public key specific to the initiator terminal in combination with the settlement request includes:
  decrypting the signature by using the public key specific to the initiator terminal to obtain a decrypted digest;
  generating a digest of the settlement request by using the predetermined digest algorithm; and
  comparing the decrypted digest with the generated digest of the settlement request to perform the verification.

An advantage of an example embodiment lies in that, the settlement institution terminal may determine whether the signature of the settlement request in the on-chain information is generated from the settlement request in the corresponding on-chain information, to determine whether the settlement request in the on-chain information is consistent with the settlement request actually generated by the initiator terminal.

Figure 6:
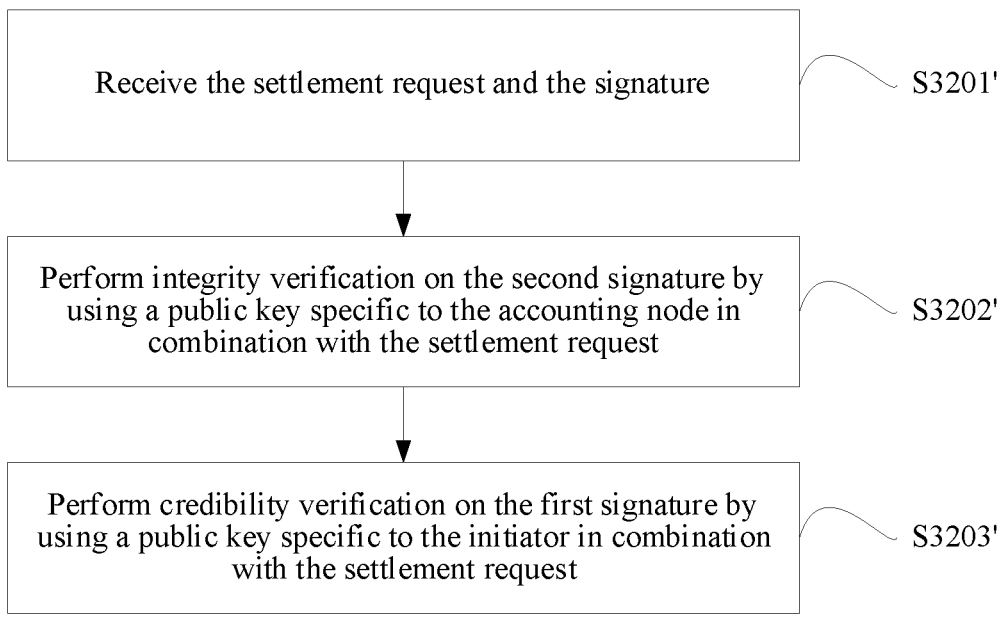
FIG. 6 is a flowchart of receiving a settlement request according to an example embodiment of the disclosure.

In an embodiment, the settlement request and the signature of the settlement request are together recorded on the blockchain as one piece of on-chain information in the settlement request data block. The signature of the settlement request includes a first signature and a second signature, where the first signature is generated for the settlement request by the initiator terminal by using a private key specific to the initiator terminal, and the second signature is generated for the settlement request by an accounting node, which on-chains the settlement request, in the blockchain by using a private key specific to the accounting node. As shown in FIG. 6, operation 320 of receiving the settlement request may include:

Operation 3201': Receive the settlement request and the signature.

Operation 3202': Perform integrity verification on the second signature by using a public key specific to the accounting node in combination with the settlement request.

Operation 3203': Perform credibility verification on the first signature by using a public key specific to the initiator terminal in combination with the settlement request.

In an example embodiment, before sending the settlement request to the blockchain for on-chaining, the initiator terminal generates the first signature for the settlement request by using the private key of the initiator terminal, and sends the settlement request and the first signature to the blockchain together. After receiving the settlement request, the accounting node in the blockchain generates the second signature for the settlement request by using the private key of the accounting node. When the settlement request is on-chained, the first signature, the second signature, and the settlement request are packed in the settlement request data block together as one piece of on-chain information and then on-chained.

In an example embodiment, the on-chain information corresponding to the settlement request includes an identifier of an accounting node that actually on-changes the settlement request. The settlement institution terminal receives the on-chain information, obtains a public key of the accounting node through the KDC according to the identifier of the accounting node, and performs integrity verification on the second signature by using the public key of the accounting node in combination with the settlement request in the on-chain information. If the integrity verification succeeds, credibility verification is performed on the first signature in the on-chain information; and if the integrity verification fails, it indicates that a transmission error occurs in the process that the blockchain transmits the on-chain information to the settlement institution terminal. In this case, the settlement institution terminal initiates a request for retransmitting the on-chain information to the blockchain to obtain the on-chain information again until the integrity verification on the second signature succeeds.

In an example embodiment, after the integrity verification performed by the settlement institution terminal on the second signature succeeds, credibility verification is performed on the first signature by using the public key of the initiator terminal in combination with the settlement request in the on-chain information. If the credibility verification succeeds, it indicates that the settlement request in the on-chain information is the settlement request actually generated by the initiator terminal; and if the credibility verification fails, it indicates that the settlement request actually generated by the initiator terminal has been modified in the on-chaining process.

An advantage of an example embodiment lies in that, the integrity verification is first performed on the second signature, to determine an identity of the accounting node that actually on-chains the settlement request while ensuring that the obtained on-chain information is consistent with the on-chain information in the blockchain, so that the accounting node may be held responsible if the subsequent credibility verification on the first signature fails. The credibility verification is then performed on the first signature, so that the settlement institution terminal may verify, according to the first signature, whether the settlement request in the on-chain information is consistent with the settlement request actually generated by the initiator terminal.

In an example embodiment, the second signature of the settlement request may be generated in the following manner:

generating, by the accounting node, a digest of the settlement request by using a predetermined digest algorithm; and encrypting, by the accounting node, the digest by using the private key specific to the accounting node to obtain the second signature.

Accordingly, the performing integrity verification on the second signature by using a public key specific to the accounting node in combination with the settlement request includes:

decrypting the second signature by using the public key specific to the accounting node to obtain a decrypted digest;

generating a digest of the settlement request by using the predetermined digest algorithm; and comparing the decrypted digest with the generated digest of the settlement request to perform the integrity verification.

In an example embodiment, a specific implementation of generating and verifying the second signature in this aspect may be the same as a specific implementation of generating and verifying a signature known in the art, and details are not described herein again.

In an example embodiment, the first signature of the settlement request may be generated in the following manner:

generating, by the initiator terminal, a digest of the settlement request by using a predetermined digest algorithm; and encrypting, by the initiator terminal, the digest by using the private key specific to the initiator terminal to obtain the first signature.

Accordingly, the performing credibility verification on the first signature by using a public key specific to the initiator terminal in combination with the settlement request includes:

decrypting the first signature by using the public key specific to the initiator terminal to obtain a decrypted digest;

generating a digest of the settlement request by using the predetermined digest algorithm; and comparing the decrypted digest with the generated digest of the settlement request to perform the credibility verification.

In an example embodiment, a specific implementation of generating and verifying the first signature in this aspect may be the same as a specific implementation of generating and verifying a signature known in the art, and details are not described herein again.

The following describes a process of the settlement institution terminal generating a settlement result in a case that the fund settlement is regulated by a regulator terminal.

Figure 7:
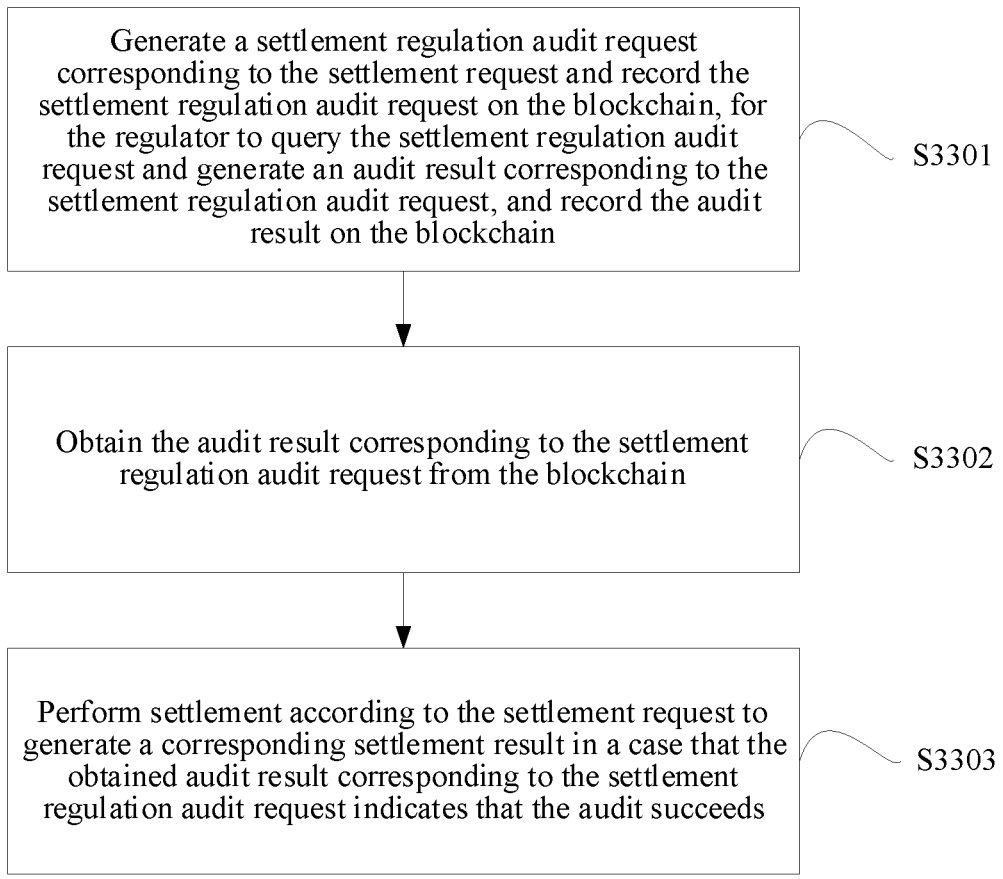
FIG. 7 is a flowchart of generating a settlement result of settlement performed according to a settlement request according to an example embodiment of the disclosure.

In an embodiment, the blockchain fund settlement system includes a regulator terminal regulating the fund settlement. As shown in FIG. 7, operation 330 of generating a settlement result may include the following operations:

Operation 3301. Generate a settlement regulation audit request corresponding to the settlement request and record the settlement regulation audit request on the blockchain, such that the regulator terminal may query the settlement regulation audit request and generate an audit result corresponding to the settlement regulation audit request, and record the audit result on the blockchain.

Operation 3302. Obtain the audit result corresponding to the settlement regulation audit request from the blockchain.

Operation 3303. Perform settlement according to the settlement request to generate a corresponding settlement result in a case that the obtained audit result corresponding to the settlement regulation audit request indicates that the audit succeeds.

In an example embodiment, the regulator is an institution responsible for regulating and auditing the fund settlement. For example, the settlement institution is a regional bank, and the regulator is a regional central bank. After receiving the settlement request, the settlement institution terminal cannot directly perform an offline settlement procedure according to the settlement request. The settlement institution terminal may perform actual offline settlement only after the settlement request is audited by the regulator terminal. Therefore, the settlement institution terminal generates a corresponding settlement regulation audit request according to the settlement request, and sends the settlement regulation audit request to the blockchain for on-chaining, such that the regulator terminal may query the settlement regulation audit request.

An advantage of an example embodiment lies in that, functions of the fund settlement system are perfected.

The following describes a process of the regulator terminal querying the settlement regulation audit request in a case that an identifier of a settlement regulation audit request data block is obtained.

In an embodiment, the regulator terminal querying the settlement regulation audit request includes:
    querying, by the regulator terminal according to the identifier of the settlement regulation audit request data block, the settlement regulation audit request data block on the blockchain, the settlement regulation audit request data block including the settlement regulation audit request; and
    obtaining, by the regulator terminal, the settlement regulation audit request from the settlement regulation audit request data block.

The settlement regulation audit request data block refers to a blockchain data block in which the settlement regulation audit request is located.

In an embodiment, the identifier of the settlement regulation audit request data block refers to at least one of a block height and a block hash value.

An advantage of an example embodiment lies in that, the regulator terminal may accurately and uniquely query, on the blockchain according to the identifier of the settlement regulation audit request data block, the data block in which the settlement regulation audit request that the regulator terminal is responsible for processing is located.

A specific implementation of an example embodiment of querying by the regulator terminal may be the same as the foregoing specific implementation of the settlement institution terminal querying, on the blockchain, the settlement request that the settlement institution terminal is responsible for processing, and details are not described herein again.

The following describes a process of the regulator terminal obtaining the identifier of the settlement regulation audit request data block.

In an embodiment, before the querying, by the regulator terminal according to the identifier of the settlement regulation audit request data block, the settlement regulation audit request data block on the blockchain, the data processing method in a blockchain fund settlement system includes:
    receiving, by the regulator terminal, the identifier of the settlement regulation audit request data block from the settlement institution terminal, where after the settlement regulation audit request data block is recorded on the blockchain, the settlement institution terminal obtains the identifier of the settlement regulation audit request data block and notifies the regulator terminal.

An advantage of an example embodiment lies in that, the identifier of the settlement regulation audit request data block is automatically notified to the regulator terminal by the settlement institution terminal after the settlement regulation audit request data block is on-chained, so that the regulator terminal may immediately perform auditing, thereby improving an audit speed.

A specific implementation of an example embodiment of the settlement institution terminal obtaining the identifier of the settlement regulation audit request data block may be the same as the foregoing corresponding specific implementation of the settlement institution terminal obtaining the identifier of the settlement request data block, and details are not described herein again.

In an embodiment, before the querying, by the regulator terminal according to the identifier of the settlement regulation audit request data block, the settlement regulation audit request data block on the blockchain, the data processing method in a blockchain fund settlement system may further include:
    periodically sending a request for obtaining the identifier of the settlement regulation audit request data block to the settlement institution terminal; and
    receiving the identifier of the settlement regulation audit request data block from the settlement institution terminal.

An advantage of an example embodiment lies in that, identifiers of settlement regulation audit request data blocks may be accumulated and then transmitted together, thereby improving the network transmission efficiency.

A specific implementation in an example embodiment in this aspect is the same as the foregoing specific implementation of the settlement institution terminal obtaining the identifier of the settlement request data block, and details are not described herein again.

The following describes a process of the regulator terminal obtaining the settlement regulation audit request from the settlement regulation audit request data block.

In an embodiment, the settlement regulation audit request includes a regulator identifier, the settlement regulation audit request data block includes a plurality of pieces of on-chain information, and the regulator terminal obtaining the settlement regulation audit request from the settlement regulation audit request data block includes:
    obtaining, by the regulator terminal, the regulator identifier and on-chain information corresponding to the regulator from the settlement regulation audit request data block as the settlement regulation audit request.

The regulator identifier refers to an identifier that may uniquely identify the regulator, such as a regulator number.

An advantage of an example embodiment lies in that, the regulator identifier is added to the on-chained settlement regulation audit request, so that the regulator terminal may accurately query, according to the regulator identifier, the settlement regulation audit request that the regulator terminal is responsible for processing.

A specific implementation in an example embodiment in this aspect may be the same as the foregoing corresponding specific implementation of the settlement institution terminal obtaining the settlement request from the settlement request data block, and details are not described herein again.

The following describes a process of the regulator terminal querying the settlement regulation audit request in a case that the identifier of the settlement regulation audit request data block is not obtained.

In an embodiment, the settlement regulation audit request includes the regulator identifier, and the querying, by the regulator terminal, the settlement regulation audit request includes:

obtaining, at intervals of a predetermined time period, a settlement regulation audit request data block recorded on the blockchain in the predetermined time period; and querying the settlement regulation audit request from the settlement regulation audit request data block according to the regulator identifier.

An advantage of an example embodiment lies in that, the regulator terminal autonomously queries the settlement regulation audit request from the blockchain, thereby alleviating the information transmission burden of the settlement institution terminal.

A specific implementation in an example embodiment in this aspect may be the same as the foregoing specific implementation of the settlement institution terminal querying, on the blockchain, the settlement request that the settlement institution terminal is responsible for processing in a case that the identifier of the settlement request data block is not obtained, and details are not described herein again.

The following describes a process of packing (or configuring) the settlement regulation audit request into the settlement regulation audit request data block for on-chaining and correspondingly querying the settlement regulation audit request from the corresponding on-chain information.

In an embodiment, the settlement regulation audit request includes the regulator identifier, the on-chain information corresponding to the settlement regulation audit request includes the regulator identifier and the settlement regulation audit request encrypted by using a public key specific to the regulator terminal corresponding to the regulator identifier in the settlement regulation audit request, and the querying the settlement regulation audit request from the settlement regulation audit request data block includes:

obtaining, by the regulator terminal, the regulator identifier and on-chain information corresponding to the regulator from the settlement regulation audit request data block; and decrypting, by the regulator terminal, the on-chain information by using a private key specific to the regulator to obtain the settlement regulation audit request.

An advantage of an example embodiment lies in that, the settlement regulation audit request in the settlement regulation audit request data block is on-chained after being encrypted. Therefore, even if the settlement regulation audit request data block is obtained by a node without a specific key, content of the on-chain information cannot be read, thereby protecting the privacy of the settlement regulation audit request in the on-chain information.

A specific implementation of an example embodiment in this aspect may be the same as the foregoing specific implementation of packing (or configuring) the settlement request into the settlement request data block for on-chaining and correspondingly querying the settlement request from the settlement request data block, and details are not described herein again.

The following describes a process of the regulator terminal receiving the settlement regulation audit request.

In an embodiment, the settlement regulation audit request and a signature of the settlement regulation audit request are together used as one piece of on-chain information in the settlement regulation audit request data block and recorded on the blockchain. The signature of the settlement regulation audit request is generated for the settlement regulation audit request by the settlement institution terminal by using a private key specific to the settlement institution terminal.

The receiving, by the regulator terminal, the settlement regulation audit request includes:

receiving, by the regulator terminal, the settlement regulation audit request and the signature; and performing, by the regulator terminal, verification on the signature by using a public key specific to the settlement institution terminal in combination with the settlement regulation audit request.

An advantage of an example embodiment lies in that, the signature is generated through encryption by using the private key of the settlement institution terminal, so that the accounting node in the blockchain cannot forge the signature without the private key of the settlement institution terminal. In this way, the regulator terminal may verify, according to the signature, whether the settlement regulation audit request in the on-chain information is consistent with the settlement regulation audit request actually generated by the settlement institution terminal.

A specific implementation of an example embodiment in this aspect may be the same as the foregoing corresponding specific implementation of the settlement institution terminal receiving the settlement request, and details are not described herein again.

In an embodiment, the signature is generated in the following manner:

generating, by the settlement institution terminal, a digest of the settlement regulation audit request by using a predetermined digest algorithm; and encrypting, by the settlement institution terminal, the digest by using the private key specific to the settlement institution terminal to obtain the signature.

An objective of generating the signature of the settlement regulation audit request is achieved in this way.

In an embodiment, the performing verification on the signature by using a public key specific to the settlement institution terminal in combination with the settlement regulation audit request includes:

decrypting, by the regulator terminal, the signature by using the public key specific to the settlement institution terminal to obtain a decrypted digest;

generating a digest of the settlement regulation audit request by using the predetermined digest algorithm; and comparing the decrypted digest with the generated digest of the settlement regulation audit request to perform the verification.

An advantage of an example embodiment lies in that, the regulator terminal may determine whether the signature of the settlement regulation audit request in the on-chain information is generated from the settlement regulation audit request in the corresponding on-chain information, to determine whether the settlement regulation audit request in the on-chain information is consistent with the settlement regulation audit request actually generated by the settlement institution terminal.

In an embodiment, the settlement regulation audit request and the signature of the settlement regulation audit request are recorded on the blockchain together as one piece of on-chain information in the settlement regulation audit request data block. The signature of the settlement regulation audit request includes a first signature and a second signature, where the first signature is generated for the settlement regulation audit request by the settlement institution terminal by using a private key specific to the settlement institution terminal, and the second signature is generated for the settlement regulation audit request by an accounting node by using a private key of the accounting node. The receiving, by the regulator terminal, the settlement regulation audit request includes:

receiving, by the regulator terminal, the settlement regulation audit request and the signature;

performing, by the regulator terminal, integrity verification on the second signature by using a public key specific to the accounting node in combination with the settlement regulation audit request; and performing, by the regulator terminal, credibility verification on the first signature by using a public key specific to the settlement institution terminal in combination with the settlement regulation audit request.

A specific implementation and advantage of an example embodiment in this aspect may be the same as the foregoing corresponding specific implementation and advantage of the settlement institution terminal receiving the settlement request, and details are not described herein again.

In an example embodiment, a specific implementation of generating and verifying the second signature may be the same as the foregoing specific implementation of generating and verifying the second signature of the settlement request, and details are not described herein again.

In an example embodiment, a specific implementation of generating and verifying the first signature may be the same as the foregoing specific implementation of generating and verifying the first signature of the settlement request, and details are not described herein again.

The following describes a process of the settlement institution terminal querying, from the blockchain, an audit result corresponding to the settlement regulation audit request in a case that an identifier of an audit result data block is obtained after the regulator terminal successfully audits the settlement regulation audit request and records the generated audit result onto the blockchain.

In an embodiment, the obtaining an audit result corresponding to the settlement regulation audit request from the blockchain includes:

querying, according to the identifier of the audit result data block, the audit result data block on the blockchain, where the audit result data block includes the audit result; and obtaining the audit result from the audit result data block.

The audit result data block refers to a blockchain data block in which the audit result is located.

In an embodiment, the identifier of the audit result data block refers to at least one of a block height and a block hash value.

An advantage of an example embodiment lies in that, the settlement institution terminal may accurately and uniquely query, on the blockchain according to the identifier of the audit result data block, the data block in which the audit result that the settlement institution terminal is responsible for processing is located.

A specific implementation of an example embodiment in this aspect may be the same as the foregoing specific implementation of the settlement institution terminal querying, on the blockchain, the settlement request that the settlement institution terminal is responsible for processing, and details are not described herein again.

The following describes a process of the settlement institution terminal obtaining the identifier of the audit result data block.

In an embodiment, before the querying, according to the identifier of the audit result data block, the audit result data block on the blockchain, the data processing method in a blockchain fund settlement system may further include:

receiving the identifier of the audit result data block from the regulator terminal, where after the audit result data block is recorded on the blockchain, the regulator terminal obtains the identifier of the audit result data block and notifies the settlement institution terminal.

An advantage of an example embodiment lies in that, the identifier of the audit result data block is automatically notified to the settlement institution terminal by the regulator terminal after the audit result data block is on-chained, so that the settlement institution terminal may immediately perform settlement, thereby improving a settlement speed.

A specific implementation in an example embodiment in this aspect may be the same as the foregoing corresponding specific implementation of the settlement institution terminal obtaining the identifier of the settlement request data block, and details are not described herein again.

In an embodiment, before the querying, according to the identifier of the audit result data block, the audit result data block on the blockchain, the data processing method in a blockchain fund settlement system may further include:

periodically sending a request for obtaining the identifier of the audit result data block to the regulator terminal; and receiving the identifier of the audit result data block from the regulator terminal.

An advantage of an example embodiment lies in that, identifiers of audit result data blocks may be accumulated and then transmitted together, thereby improving the network transmission efficiency.

A specific implementation in an example embodiment in this aspect may be the same as the foregoing corresponding specific implementation of the settlement institution terminal obtaining the identifier of the settlement request data block, and details are not described herein again.

Other possible specific implementations of the settlement institution terminal obtaining the audit result may be the same as the foregoing specific implementation of the settlement institution terminal obtaining the settlement request, and details are not described herein again.

The following describes a process of the regulator terminal querying the settlement regulation audit request and generating the audit result corresponding to the settlement regulation audit request in a case that there are a plurality of levels of regulator terminals.

In an embodiment, the regulator terminal includes a level-1 regulator terminal and a level-2 regulator terminal, and the regulator terminal querying the settlement regulation audit request, generating the audit result corresponding to the settlement regulation audit request, and recording the audit result on the blockchain includes:

querying, by the level-2 regulator terminal, the settlement regulation audit request, generating a level-2 audit result corresponding to the settlement regulation audit request, and recording the level-2 audit result on the blockchain; and querying, by the level-1 regulator terminal, the level-2 audit result and the settlement regulation audit request, generating a level-1 audit result corresponding to the settlement regulation audit request, and recording the level-1 audit result on the blockchain.

The querying, on the blockchain, the audit result corresponding to the settlement regulation audit request includes: querying, on the blockchain, the level-1 audit result and the level-2 audit result that are corresponding to the settlement regulation audit request.

The level-2 regulator refers to an institution that preliminarily audits the settlement regulation audit request, such as a region central bank.

The level-1 regulator refers to an institution that further audits the settlement regulation audit request based on an audit result of the level-2 regulator, such as a central bank headquarter.

In an example embodiment, after the settlement regulation audit request generated by the settlement institution terminal is on-chained, the settlement regulation audit request is preliminarily audited by the level-2 regulator. The level-2 regulator terminal records a preliminary audit result, that is, the level-2 audit result onto the blockchain. The level-1 regulator terminal obtains the level-2 audit result and the settlement regulation audit request from the blockchain to perform final auditing, and records the generated level-1 audit result onto the blockchain, to help the settlement institution terminal to query the level-1 audit result from the blockchain.

An advantage of an example embodiment lies in that, a requirement of auditing the settlement regulation audit request by a plurality of levels of regulator terminals is satisfied, thereby improving the flexibility of the fund settlement system.

The following describes a process of the level-2 regulator terminal querying the settlement regulation audit request in a case that the identifier of the settlement regulation audit request data block is obtained.

In an embodiment, the querying, by the level-2 regulator terminal, the settlement regulation audit request includes:
  querying, by the level-2 regulator terminal according to the identifier of the settlement regulation audit request data block, the settlement regulation audit request data block on the blockchain, where the settlement regulation audit request data block includes the settlement regulation audit request; and
  obtaining, by the level-2 regulator terminal, the settlement regulation audit request from the settlement regulation audit request data block.

In an embodiment, the identifier of the settlement regulation audit request data block refers to at least one of a block height and a block hash value.

An advantage of an example embodiment lies in that, the level-2 regulator terminal may accurately and uniquely query, on the blockchain according to the identifier of the settlement regulation audit request data block, the data block in which the settlement regulation audit request that the level-2 regulator terminal is responsible for processing is located.

A specific implementation in an example embodiment in this aspect may be the same as the foregoing specific implementation of the settlement institution terminal querying, on the blockchain, the settlement request that the settlement institution terminal is responsible for processing, and details are not described herein again.

The following describes a process of the level-2 regulator terminal obtaining the identifier of the settlement regulation audit request data block.

In an embodiment, before the querying, by the level-2 regulator terminal according to the identifier of the settlement regulation audit request data block, the settlement regulation audit request data block on the blockchain, the data processing method in a blockchain fund settlement system may further include:
  receiving, by the level-2 regulator terminal, the identifier of the settlement regulation audit request data block from the settlement institution terminal, where after the settlement regulation audit request data block is recorded on the blockchain, the settlement institution terminal obtains the identifier of the settlement regulation audit request data block and notifies the level-2 regulator terminal.

An advantage of an example embodiment lies in that, the identifier of the settlement regulation audit request data block is automatically notified to the level-2 regulator terminal by the settlement institution terminal after the settlement regulation audit request data block is on-chained, so that the level-2 regulator terminal may immediately perform auditing, thereby improving an audit speed.

A specific implementation in an example embodiment in this aspect may be the same as the foregoing corresponding specific implementation of the settlement institution terminal obtaining the identifier of the settlement request data block, and details are not described herein again.

In an embodiment, before the querying, by the level-2 regulator terminal according to the identifier of the settlement regulation audit request data block, the settlement regulation audit request data block on the blockchain, the data processing method in a blockchain fund settlement system may further include:
  periodically sending a request for obtaining an identifier of a settlement result data block to the settlement institution terminal; and
  receiving the identifier of the settlement result data block from the settlement institution terminal.

An advantage of an example embodiment lies in that, identifiers of settlement regulation audit request data blocks may be accumulated and then transmitted together, thereby improving the network transmission efficiency.

A specific implementation in an example embodiment in this aspect may be the same as the foregoing corresponding specific implementation of the settlement institution terminal obtaining the identifier of the settlement request data block, and details are not described herein again.

Other possible specific implementations of the level-2 regulator terminal obtaining the settlement regulation audit request may be the same as the foregoing specific implementation of the settlement institution terminal obtaining the settlement request, and details are not described herein again.

The following describes a process of the level-1 regulator terminal querying the level-2 audit result and the settlement regulation audit request in a case that an identifier of a level-2 audit result data block and the identifier of the settlement regulation audit request data block are obtained.

In an embodiment, the querying, by the level-1 regulator terminal, the level-2 audit result and the settlement regulation audit request includes:
  querying, by the level-1 regulator terminal according to the identifier of the level-2 audit result data block and the identifier of the settlement regulation audit request data block, the level-2 audit result data block and the settlement regulation audit request data block on the blockchain, where the level-2 audit result data block includes the level-2 audit result and the settlement regulation audit request data block includes the settlement regulation audit request; and
  obtaining, by the level-1 regulator terminal, the level-2 audit result and the settlement regulation audit request from the level-2 audit result data block and the settlement regulation audit request data block respectively.

In an embodiment, the identifier of the settlement regulation audit request data block refers to at least one of a block height and a block hash value.

In an embodiment, the identifier of the level-2 audit result data block refers to at least one of a block height and a block hash value.

An advantage of an example embodiment lies in that, the level-1 regulator terminal may accurately and uniquely query, on the blockchain according to the identifier of the level-2 audit result data block and the identifier of the settlement regulation audit request data block, the data blocks in which the level-2 audit result and the settlement regulation audit request that the level-1 regulator terminal is responsible for processing are located.

A specific implementation of the level-1 regulator terminal obtaining the level-2 audit result in an example embodiment in this aspect may be the same as the foregoing specific implementation of the settlement institution terminal querying, on the blockchain, the settlement request that the settlement institution terminal is responsible for processing, and details are not described herein again.

A specific implementation of the level-1 regulator terminal obtaining the settlement regulation audit request in an example embodiment in this aspect may be the same as the foregoing specific implementation of the settlement institution terminal querying, on the blockchain, the settlement request that the settlement institution terminal is responsible for processing, and details are not described herein again.

The specific implementation of the level-1 regulator terminal querying the level-2 audit result and the specific implementation of the level-1 regulator terminal querying the settlement regulation audit request may be performed separately.

Therefore, other possible specific implementations of the level-1 regulator terminal obtaining the level-2 audit result may be the same as the foregoing specific implementation of the settlement institution terminal obtaining the settlement request, and details are not described herein again.

In an example embodiment, before auditing the settlement regulation audit request, the level-1 regulator terminal first confirms the obtained level-2 audit result. If the level-2 audit result is that the audit succeeds, the level-1 regulator terminal queries the settlement regulation audit request from the blockchain, audits the settlement regulation audit request, and records the generated level-1 audit result onto the blockchain; and if the level-2 audit result is that the audit fails, the level-1 regulator terminal queries the settlement regulation audit request from the blockchain, determines that the audit result for the settlement regulation audit request is that the audit fails, and records the audit result onto the blockchain.

An advantage of an example embodiment lies in that, an audit process of the level-1 regulator terminal is simplified, thereby improving the audit efficiency of the level-1 regulator terminal.

Other possible specific implementations of the level-1 regulator terminal obtaining the settlement regulation audit request may be the same as the foregoing specific implementation of the settlement institution terminal obtaining the settlement request, and details are not described herein again.

Correspondingly, in a case that there are a plurality of levels of regulator terminals, the settlement institution terminal querying the audit result for the settlement regulation audit request includes: querying, on the blockchain, the level-1 audit result and the level-2 audit result for the settlement regulation audit request.

Other possible specific implementations of the settlement institution terminal obtaining the level-1 audit result may be the same as the foregoing specific implementation of the settlement institution terminal obtaining the settlement request, and details are not described herein again.

Other possible specific implementations of the settlement institution terminal obtaining the level-2 audit result may be the same as the foregoing specific implementation of the settlement institution terminal obtaining the settlement request, and details are not described herein again.

In an example embodiment, after receiving the level-1 audit result and the level-2 audit result, the settlement institution terminal performs offline fund settlement, generates a settlement result, and records the settlement result onto the blockchain only in a case that both the level-1 audit result and the level-2 audit result are that the audit succeeds. If any one of the level-1 audit result and the level-2 audit result is that the audit fails, the settlement institution terminal refuses to perform offline fund settlement, and sends information of refusing to perform offline fund settlement to the initiator terminal.

An advantage of an example embodiment lies in that, an error of the fund settlement system is reduced through the multi-level auditing for the fund settlement, thereby improving the accuracy of fund settlement auditing.

The following describes a process of the recipient terminal querying, on the blockchain, the settlement result for the settlement request.

In an embodiment, the querying, by the recipient terminal, the settlement result for the settlement request on the blockchain includes:

querying, by the recipient terminal according to an identifier of a settlement result data block, the settlement result data block on the blockchain, where the settlement result data block includes the settlement result; and obtaining, by the recipient terminal, the settlement result from the settlement result data block.

The settlement result data block refers to a data block in which the settlement result is located.

In an embodiment, the identifier of the settlement result data block refers to at least one of a block height and a block hash value.

An advantage of an example embodiment lies in that, the recipient terminal may accurately and uniquely query, on the blockchain according to the identifier of the settlement result data block, the data block in which the settlement result is located.

A specific implementation of an example embodiment in this aspect may be the same as the foregoing specific implementation of the settlement institution terminal querying, on the blockchain, the settlement request that the settlement institution terminal is responsible for processing, and details are not described herein again.

The following describes a process of the recipient terminal obtaining the identifier of the settlement result data block.

In an embodiment, before the querying, by the recipient terminal, the settlement result, the data processing method in a blockchain fund settlement system may further include:

receiving, by the recipient terminal, the identifier of the settlement result data block from the settlement institution terminal, where after the settlement result data block is recorded on the blockchain, the settlement institution terminal obtains the identifier of the settlement result data block and notifies the recipient terminal.

An advantage of an example embodiment lies in that, the identifier of the settlement result data block is automatically notified to the recipient terminal by the settlement institution terminal after the settlement result data block is on-chained, so that the recipient terminal may immediately confirm the identifier.

A specific implementation in an example embodiment in this aspect may be the same as the foregoing corresponding specific implementation of the settlement institution terminal obtaining the identifier of the settlement request data block, and details are not described herein again.

In an embodiment, before the querying, by the recipient terminal, the settlement result, the data processing method in a blockchain fund settlement system may further include: periodically sending, by the recipient terminal, a request for obtaining the identifier of the settlement result data block to the settlement institution terminal; and receiving, by the recipient terminal, the identifier of the settlement result data block from the settlement institution terminal.

An advantage of an example embodiment lies in that, identifiers of settlement result data blocks may be accumulated and then transmitted together, thereby improving the network transmission efficiency.

A specific implementation in an example embodiment in this aspect may be the same as the foregoing corresponding specific implementation of the settlement institution terminal obtaining the identifier of the settlement request data block, and details are not described herein again.

Other possible specific implementations of the recipient terminal obtaining the settlement result may be the same as the foregoing specific implementation of the settlement institution terminal obtaining the settlement request, and details are not described herein again.

The following describes a process of the third-party terminal querying the settlement result for the settlement request on the blockchain.

In an embodiment, the querying, by the third-party terminal, the settlement result for the settlement request on the blockchain includes:
  querying, by the third-party terminal according to the identifier of the settlement result data block, the settlement result data block on the blockchain, where the settlement result data block includes the settlement result; and
  obtaining, by the third-party terminal, the settlement result from the settlement result data block.

The third-party terminal refers to a third party financially related to the fund settlement, for example, a third-party payment platform responsible for transfer of partial funds in the fund settlement.

In an embodiment, the identifier of the settlement result data block refers to at least one of a block height and a block hash value.

An advantage of an example embodiment lies in that, the third-party terminal may accurately and uniquely query, on the blockchain according to the identifier of the settlement result data block, the data block in which the settlement result is located.

A specific implementation of an example embodiment in this aspect may be the same as the foregoing specific implementation of the settlement institution terminal querying, on the blockchain, the settlement request that the settlement institution terminal is responsible for processing, and details are not described herein again.

The following describes a process of the third-party terminal obtaining the identifier of the settlement result data block.

In an embodiment, before the querying, by the third-party terminal, the settlement result, the data processing method in a blockchain fund settlement system may further include:

receiving, by the third-party terminal, the identifier of the settlement result data block from the settlement institution terminal, where after the settlement result data block is recorded on the blockchain, the settlement institution terminal obtains the identifier of the settlement result data block and notifies the third-party terminal.

An advantage of an example embodiment lies in that, the identifier of the settlement result data block is automatically notified to the third-party terminal by the settlement institution terminal after the settlement result data block is on-chained, so that the third-party terminal may immediately confirm the identifier.

A specific implementation in an example embodiment in this aspect may be the same as the foregoing corresponding specific implementation of the settlement institution terminal obtaining the identifier of the settlement request data block, and details are not described herein again.

In an embodiment, before the querying, by the third-party terminal, the settlement result, the data processing method in a blockchain fund settlement system may further include:
  periodically sending, by the third-party terminal, a request for obtaining the identifier of the settlement result data block to the settlement institution terminal; and
  receiving, by the third-party terminal, the identifier of the settlement result data block from the settlement institution terminal.

An advantage of an example embodiment lies in that, identifiers of settlement result data blocks may be accumulated and then transmitted together, thereby improving the network transmission efficiency.

A specific implementation in an example embodiment in this aspect may be the same as the foregoing corresponding specific implementation of the settlement institution terminal obtaining the identifier of the settlement request data block, and details are not described herein again.

Other possible specific implementations of the third-party terminal obtaining the settlement result may be the same as the foregoing specific implementation of the settlement institution terminal obtaining the settlement request, and details are not described herein again.

The following describes processes of various example embodiments in the blockchain system shown in FIG. 1C.

A process of querying, on the blockchain, the settlement request that the settlement institution terminal is responsible for processing in a case that the settlement institution terminal obtains an identifier of a sub-blockchain in which the settlement request data block is located and the identifier of the settlement request data block in the blockchain system shown in FIG. 1C is described first.

In an embodiment, the blockchain includes a plurality of sub-blockchains, and the querying, on the blockchain, the settlement request that the settlement institution terminal is responsible for processing includes:
  querying, according to the identifier of the sub-blockchain in which the settlement request data block is located and the identifier of the settlement request data block, the settlement request data block on the sub-blockchain corresponding to the identifier of the sub-blockchain, where the settlement request data block includes the settlement request; and
  obtaining the settlement request in the settlement request data block.

The identifier of the sub-blockchain refers to an identifier that may uniquely identify the sub-blockchain, such as a sub-blockchain number.

In an example embodiment, as shown in FIG. 1D, a plurality of branches are generated inside a blockchain to which the fund settlement system is applied. A sub-blockchain of each branch only records one type of specific information, and each type of information corresponds to a specific sub-blockchain, for example, a sub-blockchain only recording settlement requests, a sub-blockchain only recording settlement regulation audit requests, a sub-blockchain only recording audit results, or a sub-blockchain only recording settlement results. In addition, each sub-blockchain has a unique identifier of the sub-blockchain, so that the nodes in the fund settlement system may query the data block on the corresponding sub-blockchain according to the identifier of the sub-blockchain.

In an example embodiment, after receiving the settlement request, the settlement institution terminal first queries the corresponding sub-blockchain on the blockchain according to the identifier of the sub-blockchain in the settlement request, then queries the corresponding settlement request data block on the sub-blockchain according to the identifier of the settlement request data block in the settlement request, and finally obtains the settlement request from the settlement request data block.

An advantage of an example embodiment lies in that, on-chain information of different types is recorded in different sub-blockchains, thereby improving the efficiency of querying the on-chain information; and the settlement institution terminal may accurately and uniquely query, on the blockchain according to the identifier of the sub-blockchain and the identifier of the settlement request data block, the data block in which the settlement request that the settlement institution terminal is responsible for processing is located.

The following describes a process of the settlement institution terminal obtaining the identifier of the sub-blockchain in which the settlement request data block is located and the identifier of the settlement request data block.

In an embodiment, before the querying, according to the identifier of the sub-blockchain in which the settlement request data block is located and the identifier of the settlement request data block, the settlement request data block on the sub-blockchain corresponding to the identifier of the sub-blockchain, the data processing method in a blockchain fund settlement system may further include:
receiving the identifier of the sub-blockchain in which the settlement request data block is located and the identifier of the settlement request data block from the initiator terminal, where after the settlement request data block is recorded on the blockchain, the initiator terminal obtains the identifier of the sub-blockchain in which the settlement request data block is located and the identifier of the settlement request data block and notifies the settlement institution terminal.

An advantage of an example embodiment lies in that, the identifier of the sub-blockchain in which the settlement request data block is located and the identifier of the settlement request data block are automatically notified to the settlement institution terminal by the initiator terminal after the settlement request data block is on-chained, so that the settlement institution terminal may immediately perform settlement, thereby improving a settlement speed.

A specific implementation in an example embodiment in this aspect may be the same as the foregoing corresponding specific implementation of the settlement institution terminal obtaining the identifier of the settlement request data block, and details are not described herein again.

In an embodiment, before the querying, according to the identifier of the sub-blockchain in which the settlement request data block is located and the identifier of the settlement request data block, the settlement request data block on the sub-blockchain corresponding to the identifier of the sub-blockchain, the data processing method in a blockchain fund settlement system may further include:
periodically sending a request for obtaining the identifier of the sub-blockchain in which the settlement request data block is located and the identifier of the settlement request data block to the initiator terminal; and
receiving the identifier of the sub-blockchain in which the settlement request data block is located and the identifier of the settlement request data block from the initiator terminal.

An advantage of an example embodiment lies in that, identifiers of sub-blockchains in which settlement request data blocks are located and identifiers of settlement request data blocks may be accumulated and then transmitted together, thereby improving the network transmission efficiency.

A specific implementation in an example embodiment in this aspect may be the same as the foregoing corresponding specific implementation of the settlement institution terminal obtaining the identifier of the settlement request data block, and details are not described herein again.

In addition, other possible specific implementations in the blockchain architecture shown in FIG. 1D may be the same as the foregoing corresponding specific implementations in the blockchain architectures shown in FIG. 1A to FIG. 1C, and details are not described herein again.

Figure 8:
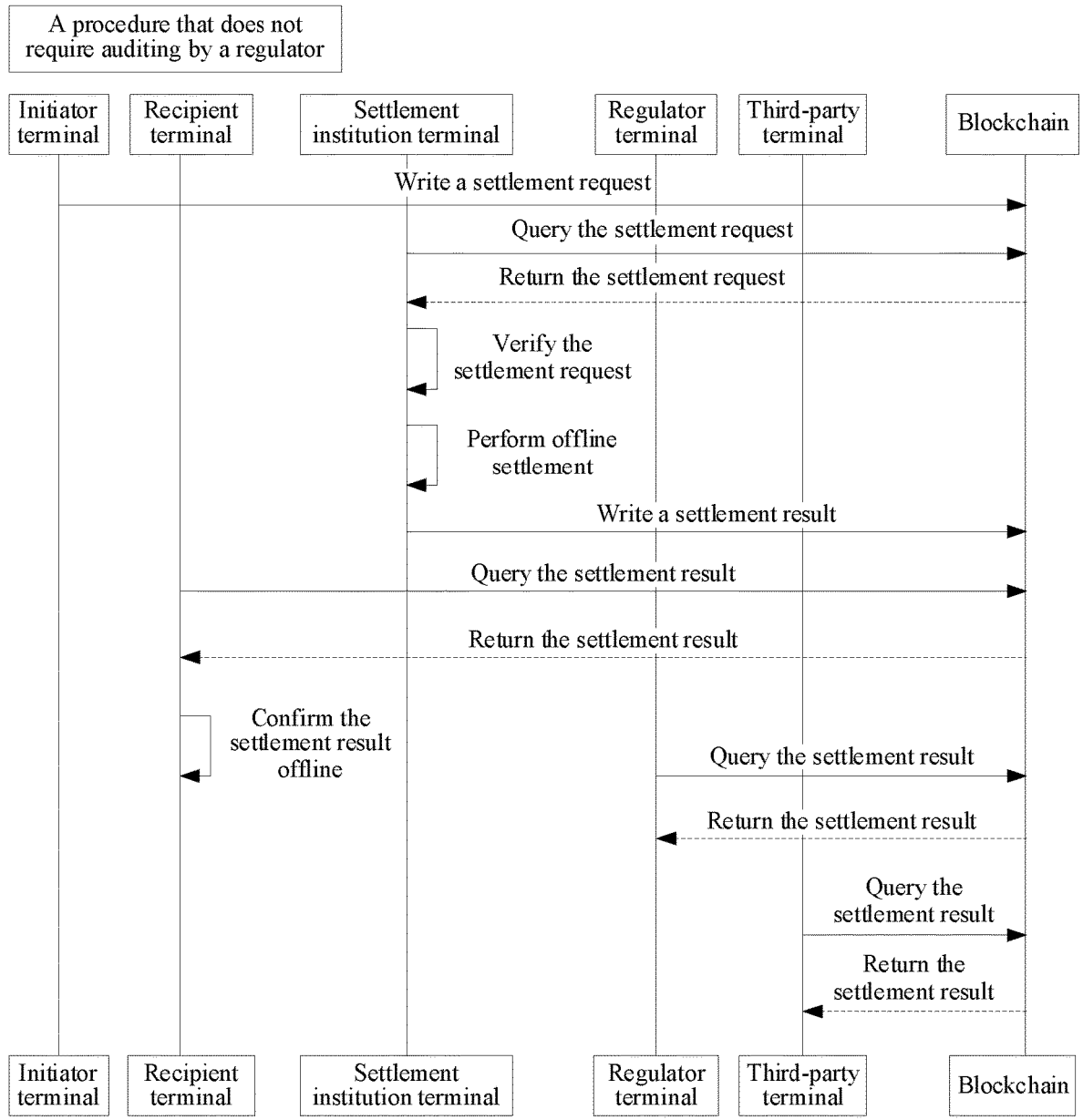
FIG. 8 is an interaction diagram of node terminals in a blockchain fund settlement system according to an example embodiment of the disclosure.

An interaction procedure among the nodes in the blockchain fund settlement system in a case that auditing by the regulator is not required is described below with reference to FIG. 8. The initiator terminal generates a settlement request and writes the settlement request onto the blockchain; the settlement institution terminal queries the settlement request on the blockchain and obtains a returned settlement request from the blockchain; the settlement institution terminal verifies the settlement request and performs offline settlement if the verification succeeds; the settlement institution terminal generates a settlement result and writes the settlement result onto the blockchain; the recipient terminal queries the settlement result on the blockchain and obtains a returned settlement result from the blockchain; the recipient terminal confirms the settlement result offline; the regulator terminal queries the settlement result on the blockchain and obtains a returned settlement result from the blockchain; and the third-party terminal queries the settlement result on the blockchain and obtains a returned settlement result from the blockchain.

Figure 9:
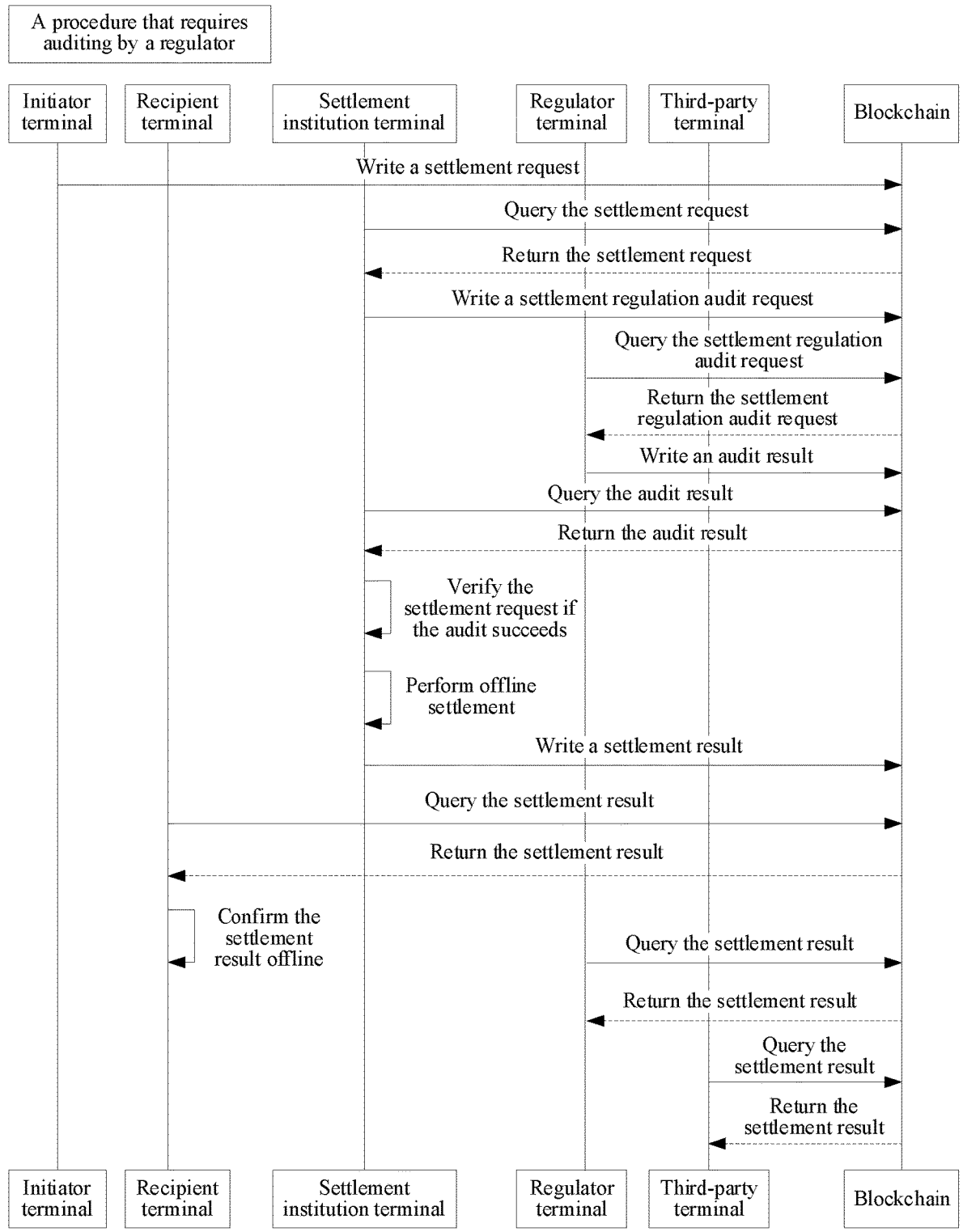
FIG. 9 is an interaction diagram of node terminals in a blockchain fund settlement system according to an example embodiment of the disclosure.

An interaction procedure among the nodes in the blockchain fund settlement system in a case that auditing by the regulator is required is described below with reference to FIG. 9. The initiator terminal generates a settlement request and writes the settlement request onto the blockchain; the settlement institution terminal queries the settlement request on the blockchain and obtains a returned settlement request from the blockchain; the settlement institution terminal generates a settlement regulation audit request and writes the settlement regulation audit request onto the blockchain; the regulator terminal queries the settlement regulation audit request on the blockchain and obtains a returned settlement regulation audit request from the blockchain; the regulator terminal generates an audit result and writes the audit result onto the blockchain; the settlement institution terminal queries the audit result on the blockchain, obtains a returned audit result from the blockchain, verifies the settlement request if the audit result indicates that the audit succeeds, and performs offline settlement if the verification succeeds;

the settlement institution terminal generates a settlement result and writes the settlement result onto the blockchain; the recipient terminal queries the settlement result on the blockchain and obtains a returned settlement result from the blockchain; the recipient terminal confirms the settlement result offline; the regulator terminal queries the settlement result on the blockchain and obtains a returned settlement result from the blockchain; and the third-party terminal queries the settlement result on the blockchain and obtains a returned settlement result from the blockchain.

Figure 10:
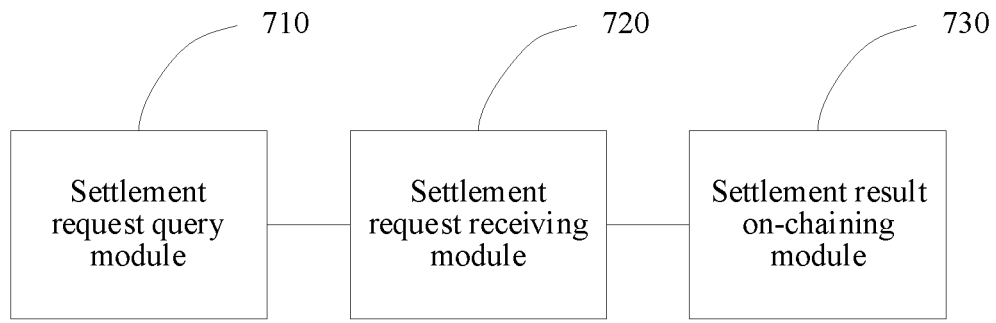
FIG. 10 is a diagram of modules of a settlement institution apparatus in a blockchain fund settlement system according to an example embodiment of the disclosure.

As shown in FIG. 10, according to an embodiment of the disclosure, a settlement institution apparatus in a blockchain fund settlement system is further provided. The settlement institution apparatus includes:

a settlement request query module 710, configured to query, on a blockchain, a settlement request that the settlement institution terminal is responsible for processing, the settlement request being generated by the initiator and recorded on the blockchain;

a settlement request receiving module 720, configured to receive the settlement request; and a settlement result on-chaining module 730, configured to generate a settlement result of settlement performed according to the settlement request and record the settlement result on the blockchain, for the recipient to query the settlement result.

In an embodiment, the settlement request query module 710 is configured to:

query, according to an identifier of a settlement request data block, the settlement request data block on the blockchain, the settlement request data block including the settlement request; and obtain the settlement request in the settlement request data block.

In an embodiment, the identifier of the settlement request data block refers to at least one of a block height and a block hash value.

In an embodiment, the settlement request query module 710 is further configured to:

receive, before querying the settlement request data block on the blockchain according to the identifier of the settlement request data block, the identifier of the settlement request data block from the initiator, where after the settlement request data block is recorded on the blockchain, the initiator obtains the identifier of the settlement request data block and notifies the settlement institution terminal.

In an embodiment, the settlement request query module 710 is further configured to:

periodically send, before querying the settlement request data block on the blockchain according to the identifier of the settlement request data block, a request for obtaining the identifier of the settlement request data block to the initiator; and receive the identifier of the settlement request data block from the initiator.

In an embodiment, the settlement request includes a settlement institution identifier, the settlement request data block includes a plurality of pieces of on-chain information, and the settlement request query module 710 is further configured to:

obtain the settlement institution identifier and on-chain information corresponding to the settlement institution from the settlement request data block as the settlement request.

In an embodiment, the settlement request includes the settlement institution identifier, and the settlement request query module 710 is further configured to:

obtain, at intervals of a predetermined time period, a settlement request data block recorded on the blockchain in the predetermined time period; and query the settlement request from the settlement request data block according to the settlement institution identifier.

In an embodiment, the settlement request includes the settlement institution identifier, the on-chain information corresponding to the settlement request includes the settlement institution identifier and the settlement request encrypted by using a public key specific to the settlement institution corresponding to the settlement institution identifier in the settlement request, and the settlement request query module 710 is further configured to:

obtain the settlement institution identifier and on-chain information corresponding to the settlement institution from the settlement request data block; and decrypt the on-chain information by using a private key specific to the settlement institution to obtain the settlement request.

In an embodiment, the settlement request and a signature of the settlement request are together used as one piece of on-chain information in the settlement request data block and recorded on the blockchain, where the signature of the settlement request is generated for the settlement request by the initiator terminal by using a private key specific to the initiator terminal, and the settlement request receiving module 720 is configured to:

receive the settlement request and the signature; and perform verification on the signature by using a public key specific to the initiator terminal in combination with the settlement request.

In an embodiment, the signature is generated in the following manner:

generating, by the initiator, a digest of the settlement request by using a predetermined digest algorithm; and encrypting, by the initiator, the digest by using the private key specific to the initiator terminal to obtain the signature.

In an embodiment, the settlement request receiving module 720 is configured to:

decrypt the signature by using the public key specific to the initiator to obtain a decrypted digest;

generate a digest of the settlement request by using the predetermined digest algorithm; and compare the decrypted digest with the generated digest of the settlement request to perform the verification.

In an embodiment, the settlement request and the signature of the settlement request are recorded on the blockchain together as one piece of on-chain information in the settlement request data block, the signature of the settlement request includes a first signature and a second signature, where the first signature is generated for the settlement request by the initiator terminal by using a private key specific to the initiator terminal, and the second signature is generated for the settlement request by an accounting node, which on-chains the settlement request, in the blockchain by using a private key of the accounting node, and the settlement request receiving module 720 is configured to:

receive the settlement request and the signature;

perform integrity verification on the second signature by using a public key specific to the accounting node in combination with the settlement request; and perform credibility verification on the first signature by using a public key specific to the initiator terminal in combination with the settlement request.

In an embodiment, the second signature of the settlement request is generated in the following manner:

generating, by the accounting node, a digest of the settlement request by using a predetermined digest algorithm;

encrypting, by the accounting node, the digest by using the private key specific to the accounting node to obtain the second signature.

In an embodiment, the settlement request receiving module 720 is configured to:

decrypt the second signature by using the public key specific to the accounting node to obtain a decrypted digest;

generate a digest of the settlement request by using the predetermined digest algorithm; and compare the decrypted digest with the generated digest of the settlement request to perform the integrity verification.

In an embodiment, the first signature of the settlement request is generated in the following manner:

generating, by the initiator, a digest of the settlement request by using a predetermined digest algorithm; and encrypting, by the initiator, the digest by using the private key specific to the initiator terminal to obtain the first signature.

In an embodiment, the settlement request receiving module 720 is configured to:

decrypt the first signature by using the public key specific to the initiator terminal to obtain a decrypted digest;

generate a digest of the settlement request by using the predetermined digest algorithm; and compare the decrypted digest with the generated digest of the settlement request to perform the credibility verification.

Figure 11:
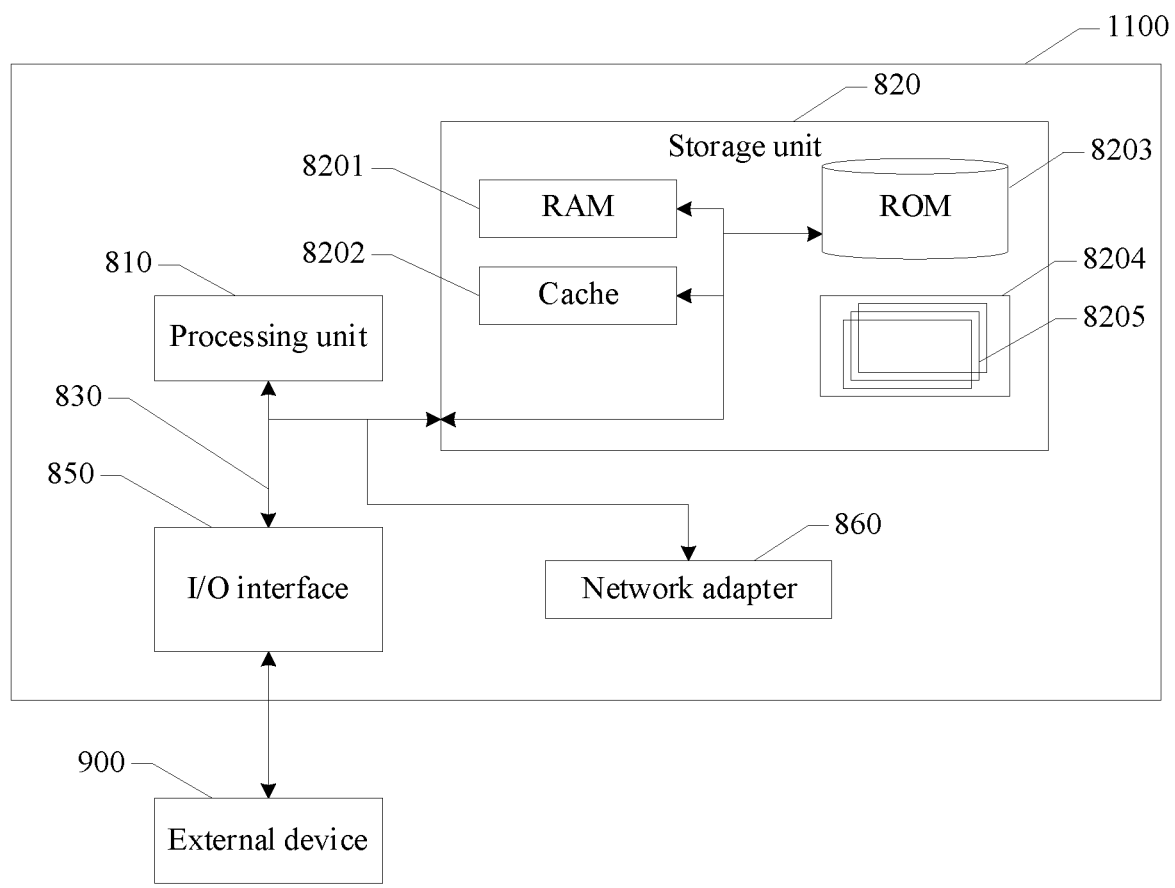
FIG. 11 is a structural diagram of hardware of a settlement institution terminal in a blockchain fund settlement system according to an example embodiment of the disclosure.

The data processing method in the blockchain fund settlement system according to the embodiments of the disclosure may be implemented by a settlement institution terminal 1100 in FIG. 11. The following describes the settlement institution terminal 1100. The settlement institution terminal 1100 of an example embodiment of the disclosure is described with reference to FIG. 11. The settlement institution terminal 1100 shown in FIG. 11 is merely an example, and is not to constitute any limitation on functions and a use scope of the embodiments of the disclosure.

As shown in FIG. 11, the settlement institution terminal 1100 is represented in the form of a general-purpose computing device, and components of the settlement institution terminal 1100 may include, but not limited to: at least one processing unit 810, at least one storage unit 820, and a bus 830 connecting different system components (including the storage unit 820 and the processing unit 810).

The storage unit 820 stores program code. The program code may be executed by the processing unit 810 to cause the processing unit 810 to perform the operations according to the example implementations of the disclosure described in the example methods in this specification. For example, the processing unit 810 may perform the operations shown in FIG. 4.

The storage unit 820 may include a readable medium in the form of a volatile storage unit, for example, a random access memory (RAM) 8201 and/or a cache storage unit 8202, and may further include a read-only memory (ROM) 8203.

The storage unit 820 may further include a program/utility tool 8204 having a group of (at least one) program modules 8205. Such a program module 8205 includes, but is not limited to, an operating system, one or more application programs, other program modules, and program data. Each or a combination of these examples may include implementation of a network environment.

The bus 830 may indicate one or more of several types of bus structures, including a storage unit bus or storage unit controller, a peripheral bus, an accelerated graphics port, a processing unit, or a local bus using any of a plurality of bus structures.

The settlement institution terminal 1100 may further communicate with one or more external devices 900 (for example, a keyboard, a pointing device, and a Bluetooth device), and may alternatively communicate with one or more devices that enable users to interact with the settlement institution terminal 1100, and/or communicate with any device (for example, a router or a modem) that enables the settlement institution terminal 1100 to communicate with one or more other computing devices. Such communication may be performed through an input/output (I/O) interface 850. In addition, the settlement institution terminal 1100 may alternatively communicate with one or more networks (for example, a local area network (LAN), a wide area network (WAN), and/or a public network, such as the Internet) through a network adapter 860. As shown in the figure, the network adapter 860 communicates with other modules of the settlement institution terminal 1100 through the bus 830. It is to be understood that, although not shown in the figure, other hardware and/or software modules may be used in combination with the settlement institution terminal 1100, including, but not limited to, micro code, a device driver, a redundancy processing unit, an external disk drive array, a redundant array of independent drives (RAID) system, a tape drive, a data backup storage system, or the like.

In an embodiment, a computer program product is disclosed, including instructions, the instructions, when run on a computer, causing the computer to perform any method described above.

Through the description of the foregoing implementations, a person skilled in the art may easily understand that the example implementations described herein may be implemented through software, or may be implemented through software in combination with hardware. Therefore, the technical solutions of the implementations of the disclosure may be implemented in the form of a software product. The software product may be stored in a non-volatile storage medium (which may be a CD-ROM, a USB flash drive, a removable hard disk, or the like) or in a network and includes several instructions for instructing a computing device (which may be a personal computer, a server, a terminal apparatus, a network device, or the like) to perform the method described in the implementations of the disclosure.

In an example embodiment of the disclosure, a computer program medium is further provided, storing computer-readable instructions, the computer-readable instructions, when executed by a processor of a computer, causing the computer to perform the method described in the foregoing method embodiments.

According to an embodiment of the disclosure, a program product for implementing the method in the foregoing method embodiments is further provided. The program product may use a portable compact disc read-only memory (CD-ROM) and include program code, and may be run on a terminal device such as a personal computer. However, the program product in the disclosure is not limited thereto. In the disclosure, the readable storage medium may be any tangible medium including or storing a program, and the program may be used by or used in combination with an instruction execution system, an apparatus, or a device.

The program product may be any combination of one or more readable mediums. The readable medium may be a readable signal medium or a readable storage medium. The readable storage medium may be, for example, but is not limited to, an electric, magnetic, optical, electromagnetic, infrared, or semi-conductive system, apparatus, or device, or any combination thereof. More specific examples of the readable storage medium (a non-exhaustive list) include: an electrical connection having one or more wires, a portable disk, a hard disk, a RAM, a ROM, an erasable programmable ROM (EPROM or a flash memory), an optical fiber, a CD-ROM, an optical storage device, a magnetic storage device, or any appropriate combination thereof.

The computer-readable signal medium may include a data signal being in a baseband or transmitted as a part of a carrier, which carries readable program code. The propagated data signal may be in a plurality of forms, including, but not limited to, an electromagnetic signal, an optical signal, or any appropriate combination thereof. The readable signal medium may alternatively be any readable medium other than the readable storage medium, and the readable medium may send, propagate, or transmit a program used by or in combination with an instruction execution system, apparatus, or device.

The program code included in the readable medium may be transmitted by using any appropriate medium, including but not limited to: a wireless medium, a wired medium, an optical cable, radio frequency (RF), any appropriate combination thereof, or the like.

The program code configured to execute the operations of the disclosure may be written by using any combination of one or more programming languages. The programming languages include an object-oriented programming language such as Java and C++, and also include a conventional procedural programming language such as "C" language or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a LAN or a WAN, or may be connected to an external computing device (for example, through the Internet by using an Internet service provider).

Although a plurality of modules or units of a device configured to perform actions are discussed in the foregoing detailed description, such division is not mandatory. In fact, according to the implementations of the disclosure, features and functions of two or more modules or units described above may be further divided to be embodied by a plurality of modules or units.

In addition, although the operations of the method in the disclosure are described in a specific order in the accompanying drawings, this does not require or imply that the operations are bound to be performed in the specific order, or all the operations shown are bound to be performed to achieve the desired result. Additionally or alternatively, some operations may be omitted, a plurality of operations may be combined into one operation for execution, and/or one operation may be divided into a plurality of operations for execution.

Through the description of the foregoing implementations, a person skilled in the art may easily understand that the example implementations described herein may be implemented through software, or may be implemented through software in combination with hardware. Therefore, the technical solutions of the implementations of the disclosure may be implemented in the form of a software product. The software product may be stored in a non-volatile storage medium (which may be a CD-ROM, a USB flash drive, a removable hard disk, or the like) or in a network and includes several instructions for instructing a computing device (which may be a personal computer, a server, a mobile terminal, a network device, or the like) to perform the method described in the implementations of the disclosure.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The example embodiments of the disclosure provide a decentralized blockchain fund settlement system. In the blockchain fund settlement system, the settlement request of the initiator is recorded on the blockchain, and the settlement institution terminal may search for the settlement request on the blockchain; the settlement result is also recorded on the blockchain, and the recipient may query the settlement result on the blockchain. Writing and querying of the entire request and the settlement result are completed on the chain, and the fund settlement system may effectively prevent tampering and attack due to the strong tamper-proof characteristic of the blockchain, thereby improving the security of on-chain information.

After considering the specification and practicing the disclosure, a person skilled in the art may easily conceive of other implementations of the disclosure. The disclosure is intended to cover any variation, use, or adaptive change of the disclosure. These variations, uses, or adaptive changes follow the general principles of the disclosure and include common general knowledge or common technical means in the art that are not disclosed in the disclosure. The specification and the embodiments are merely for an illustration purpose, and the true scope and spirit of this disclosure are pointed out by the appended claims.

What is claimed is:

1. A data processing method in a blockchain fund settlement system, the method being performed by at least one processor of a settlement institution terminal, the method comprising:
  displaying, via a user interface on the settlement institution terminal, a screen including a text indicating height information of a settlement request data block in which a settlement request is located and a visual option for selection to query the settlement request, wherein the settlement request is to be processed by the settlement institution terminal between a fund settlement initiator and a fund settlement recipient, the settlement request being generated by an initiator terminal of the fund settlement initiator and recorded on a blockchain;
  querying, on the blockchain, the settlement request based on a selection via the visual option for querying the settlement request;
  displaying, via the user interface on the settlement institution terminal a screen including the settlement request found based on the querying and a visual option for selection to verify the settlement request;
  performing verification upon selection of the visual option for selection to verify the settlement request and when the verification succeeds, displaying a screen including an indication that the verification succeeds;
  generating a settlement result of a settlement performed according to the settlement request, and recording a settlement result data block of the settlement result on the blockchain;
  receiving height information of a data block in which the settlement result is located, and displaying, via a user interface on the settlement institution terminal, a text indicating that the settlement result has been recorded and a text indicating the height information of the data block in which the settlement result is located; and
  automatically transmitting the height information of the settlement result data block to a recipient terminal of the fund settlement recipient, to be displayed via a user interface of the recipient terminal with a visual option for selection to query the settlement result data block on the blockchain using the height information of the data block in which the settlement result is located,
  wherein the settlement request and a signature of the settlement request are recorded on the blockchain, and the signature of the settlement request comprises a first signature and a second signature,
  wherein the first signature is generated for the settlement request by the initiator terminal by using a private key specific to the initiator terminal, and the second signature is generated for the settlement request by an accounting node, which on-chains the settlement request on the blockchain by using a private key specific to the accounting node, and
  wherein the performing the verification comprises:
  receiving the settlement request, the first signature, and the second signature;
  performing integrity verification on the second signature by using a public key, specific to the accounting node, and the settlement request;
  when the integrity verification fails, initiating a request for retransmitting on-chain information to the blockchain; and
  when the integrity verification succeeds, performing credibility verification on the first signature by using a public key, specific to the initiator terminal, and the settlement request.

2. The method according to claim 1, further comprising, prior to the querying the settlement request data block:
  receiving the height information of the settlement request data block from the initiator terminal when the settlement request data block is recorded on the blockchain.

3. The method according to claim 1, further comprising, prior to the querying the settlement request data block:
  periodically transmitting a request for obtaining the height information of the settlement request data block to the initiator terminal; and
  receiving the height information of the settlement request data block from the initiator terminal.

4. The method according to claim 1, wherein the settlement request comprises a settlement institution identifier, and the querying the settlement request comprises:
  obtaining, at intervals of a predetermined time period, the settlement request data block recorded on the blockchain in the predetermined time period; and
  querying the settlement request from the settlement request data block according to the settlement institution identifier.

5. The method according to claim 1, wherein the blockchain fund settlement system comprises a regulator terminal of a regulator that regulates a fund settlement, and
  wherein the generating the settlement result comprises:
  generating a settlement regulation audit request corresponding to the settlement request and recording the settlement regulation audit request on the blockchain;
  obtaining an audit result corresponding to the settlement regulation audit request from the blockchain, the audit result being generated by the regulator terminal and recorded on the blockchain; and
  performing the settlement according to the settlement request to generate the settlement result and recording the settlement result on the blockchain based on the audit result indicating that au auditing succeeds.

6. The method according to claim 5, wherein the recording the settlement regulation audit request comprises:
  obtaining an identifier of a settlement regulation audit request data block based on the settlement regulation audit request data block being recorded on the blockchain and notifying the regulator terminal of the identifier of the settlement regulation audit request data block.

7. The method according to claim 5, wherein the obtaining the audit result comprises:
  querying, according to an identifier of an audit result data block, the audit result data block on the blockchain, the audit result data block comprising the audit result; and
  obtaining the audit result from the audit result data block.

8. The method according to claim 1, wherein the blockchain fund settlement system comprises a third party terminal of a third party that is related to the settlement between the fund settlement initiator and the fund settlement recipient, and
  the method further comprises notifying the third party terminal of the height information of the settlement result data block, the height information of the settlement result data block being used to query the settlement result data block on the blockchain.

9. A settlement institution terminal, comprising:
a memory configured to store computer-readable instructions; and
a processor configured to read the computer-readable instructions stored in the memory to perform the method according to claim 1.

10. A settlement institution apparatus in a blockchain fund settlement system, the settlement institution apparatus comprising:
at least one memory configured to store program code; and
at least one processor configured to read the program code and operate as instructed by the program code, the program code comprising:
first displaying code configured to cause at least one of the at least one processor to display, via a user interface on the settlement institution apparatus, a text indicating height information of a settlement request data block in which a settlement request is located and a visual option for selection to query the settlement request, wherein the settlement request is to be processed by the settlement institution apparatus between a fund settlement initiator and a fund settlement recipient, the settlement request being generated by an initiator terminal of the fund settlement initiator and recorded on a blockchain;
settlement request query code configured to cause at least one of the at least one processor to query, on the blockchain, the settlement request based on a selection via the visual option for querying the settlement request;
second displaying code configured to cause at least one of the at least one processor to display, via the user interface on the settlement institution terminal a screen including the settlement request found based on the querying and a visual option for selection to verify the settlement request;
verification code configured to cause at least one of the at least one processor to perform verification upon selection of the visual option for selection to verify the settlement request and when the verification succeeds, display a screen including an indication that the verification succeeds;
settlement result on-chaining code configured to cause at least one of the at least one processor to generate a settlement result of a settlement performed according to the settlement request, record a settlement result data block of the settlement result on the blockchain;
third displaying code configured to cause at least one of the at least one processor to receive height information of a data block in which the settlement result is located, and display, via a user interface on the settlement institution apparatus, a text indicating that the settlement result has been recorded and a text indicating the height information of the data block in which the settlement result is located; and
height information transmission code configured to cause at least one of the at least one processor to automatically transmit the height information of the settlement result data block to a recipient terminal of the fund settlement recipient, to be displayed via a user interface of the recipient terminal with a visual option for selection to query the settlement result data block on the blockchain using the height information of the data block in which the settlement result is located,
wherein the settlement request and a signature of the settlement request are recorded on the blockchain, and the signature of the settlement request comprises a first signature and a second signature,
wherein the first signature is generated for the settlement request by the initiator terminal by using a private key specific to the initiator terminal, and the second signature is generated for the settlement request by an accounting node, which on-chains the settlement request on the blockchain by using a private key specific to the accounting node, and
wherein the verification code is configured to cause at least one of the at least one processor to perform verification by:
receiving the settlement request, the first signature, and the second signature;
performing integrity verification on the second signature by using a public key, specific to the accounting node, and the settlement request;
when the integrity verification fails, initiating a request for retransmitting on-chain information to the blockchain; and
when the integrity verification succeeds, performing credibility verification on the first signature by using a public key, specific to the initiator terminal, and the settlement request.

11. The settlement institution apparatus according to claim 10, wherein the program code further comprises height information receiving code configured to cause at least one of the at least one processor to receive the height information of the settlement request data block from the initiator terminal when the settlement request data block is recorded on the blockchain.

12. The settlement institution apparatus according to claim 10, wherein the program code further comprises transmitting code configured to cause at least one of the at least one processor to periodically transmit a request for obtaining the height information of the settlement request data block to the initiator terminal.

13. The settlement institution apparatus according to claim 10, wherein the settlement request comprises a settlement institution identifier, and
wherein the settlement request query code is further configured to cause at least one of the at least one processor to obtain, at intervals of a predetermined time period, the settlement request data block recorded on the blockchain in the predetermined time period, and query the settlement request from the settlement request data block according to the settlement institution identifier.

14. A non-transitory computer-readable storage medium, storing computer-readable instructions, the computer-readable instructions, when executed by a processor of a computer, causing the computer to perform a data processing method performed by a settlement institution terminal in a blockchain fund settlement system, the method comprising:
displaying, via a user interface on the settlement institution terminal, a text indicating height information of a settlement request data block in which a settlement request is located and a visual option for selection to query the settlement request, wherein the settlement request is to be processed by the settlement institution terminal between a fund settlement initiator and a fund settlement recipient, the settlement request being generated by an initiator terminal of the fund settlement initiator and recorded on a blockchain;
querying, on the blockchain, the settlement request based on a selection via the visual option for querying the settlement request;
displaying, via the user interface on the settlement institution terminal a screen including the settlement request found based on the querying and a visual option for selection to verify the settlement request;
performing verification upon selection of the visual option for selection to verify the settlement request and when the verification succeeds, displaying a screen including an indication that the verification succeeds;
generating a settlement result of a settlement performed according to the settlement request, and recording a settlement result data block of the settlement result on the blockchain;
receiving height information of a data block in which the settlement result is located, and displaying, via a user interface on the settlement institution terminal, a text indicating that the settlement result has been recorded and a text indicating the height information of the data block in which the settlement result is located; and
automatically transmitting the height information of the settlement result data block to a recipient terminal of the fund settlement recipient, to be displayed via a user interface of the recipient terminal with a visual option for selection to query the settlement result data block on the blockchain using the height information of the data block in which the settlement result is located,
wherein the settlement request and a signature of the settlement request are recorded on the blockchain, and the signature of the settlement request comprises a first signature and a second signature,
wherein the first signature is generated for the settlement request by the initiator terminal by using a private key specific to the initiator terminal, and the second signature is generated for the settlement request by an accounting node, which on-chains the settlement request on the blockchain by using a private key specific to the accounting node, and
wherein the performing the verification comprises:
receiving the settlement request, the first signature, and the second signature;
performing integrity verification on the second signature by using a public key, specific to the accounting node, and the settlement request;
when the integrity verification fails, initiating a request for retransmitting on-chain information to the blockchain; and
when the integrity verification succeeds, performing credibility verification on the first signature by using a public key, specific to the initiator terminal, and the settlement request.

\* \* \* \* \*